(12) United States Patent
Katsuki et al.

(10) Patent No.: US 6,259,859 B1
(45) Date of Patent: Jul. 10, 2001

(54) RECORDING APPARATUS, RECORDING/REPRODUCING APPARATUS AND RECORDING METHOD

(75) Inventors: Shinji Katsuki; Takashi Kawakami, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/211,077

(22) Filed: Dec. 14, 1998

(30) Foreign Application Priority Data

Dec. 26, 1997 (JP) .................................................. P09-360111

(51) Int. Cl.[7] .................................................. H04N 5/928
(52) U.S. Cl. ............................................. 386/104; 386/112
(58) Field of Search ................................ 386/46, 96, 104, 386/105, 106, 112, 107, 117, 109, 111, 98; 358/906, 909.1; H04N 5/928

(56) References Cited

U.S. PATENT DOCUMENTS

| | | | |
|---|---|---|---|
| 5,629,740 | * 5/1997 | Tanaka et al. | 386/104 |
| 5,892,884 | * 4/1999 | Sugiyama et al. | 386/104 |
| 5,937,138 | * 9/1999 | Fukuda et al. | 386/112 |

* cited by examiner

*Primary Examiner*—Huy Nguyen
(74) *Attorney, Agent, or Firm*—Oblon, Spivak, McClelland, Maier & Neustadt, P.C.

(57) ABSTRACT

A recording apparatus for storing input video and audio data temporarily in a memory, reading out back the video and audio data from the memory and recording the video and audio data into a recording medium wherein a storage-size of the memory is found and video data to be stored in the memory is thinned in accordance with the storage-size so that audio data of a minimum required amount can be stored in the memory to prevent continuity of audio data recorded in the recording medium from becoming unsustainable.

15 Claims, 12 Drawing Sheets

F I G. 1
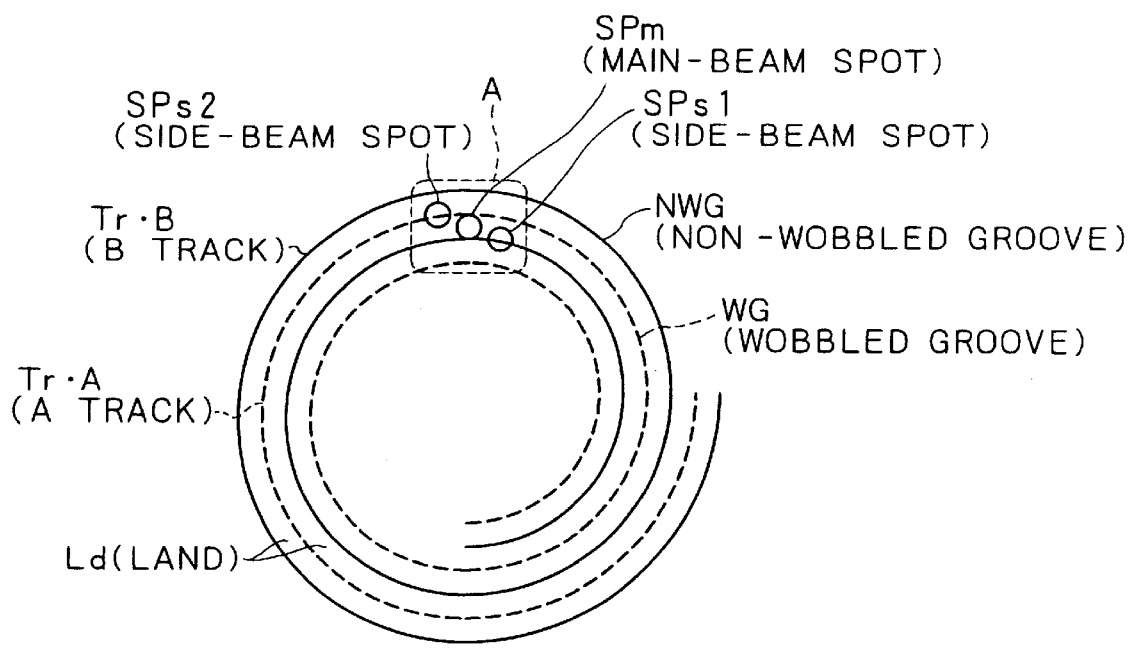
F I G. 2
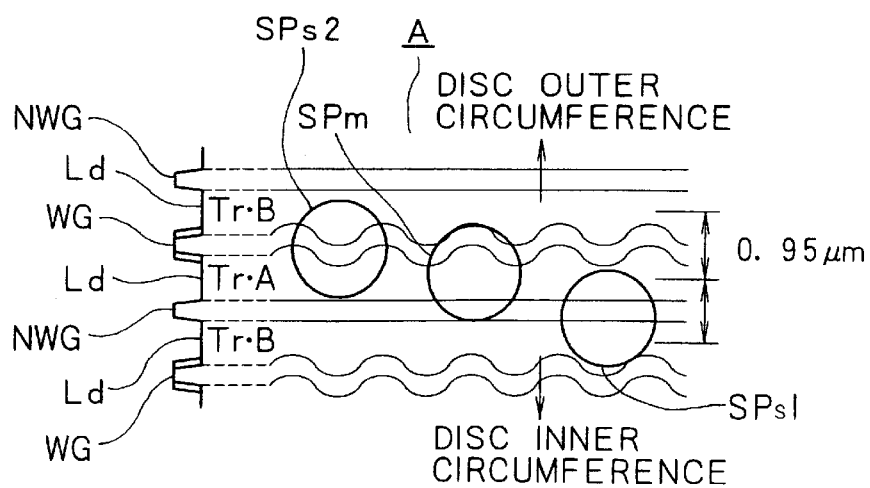

FIG. 3

| | MD-DATA2 | MD-DATA1 |
|---|---|---|
| TRACK PITCH | 0.95 μm | 1.6 μm |
| BIT LENGTH | 0.39 μm/bit | 0.59 μm/bit |
| λ · NA | 650nm · 0.52 | 780nm · 0.45 |
| RECORDING SYSTEM | LAND RECORDING | GROOVE RECORDING |
| ADDRESSING SYSTEM | INTERLACE ADDRESSING (WOBBLE ON ONE SIDE OF EACH OF 2 SPIRALS) | WOBBLES ON BOTH SIDES OF A SINGLE SPIRAL |
| MODULATION SYSTEM | PLL (1, 7) | EFM |
| ERROR CORRECTION SYSTEM | RS-PC | ACIRC |
| INTERLEAVE | BLOCK CLOSED TYPE | CONVOLUTION |
| REDUNDANCY | 19.7 % | 46.3% |
| LINEAR VELOCITY | 2.0m/s | 1.2m/s |
| DATA RATE | 589KB/s | 133KB/s |
| RECORDING CAPACITY | 650MB | 140MB |

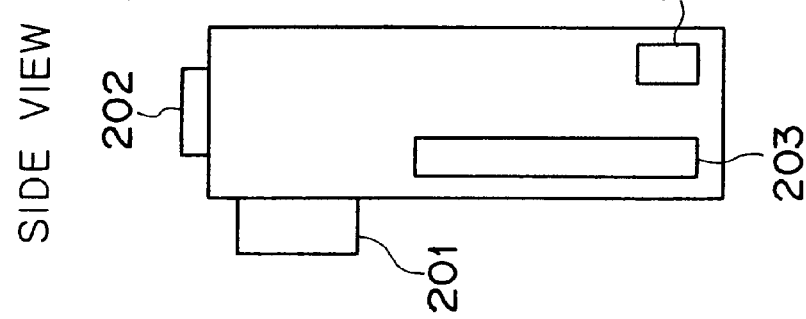
FIG. 4C SIDE VIEW
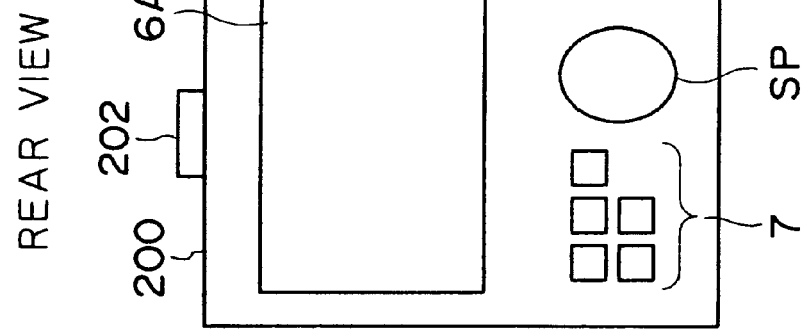
FIG. 4B REAR VIEW
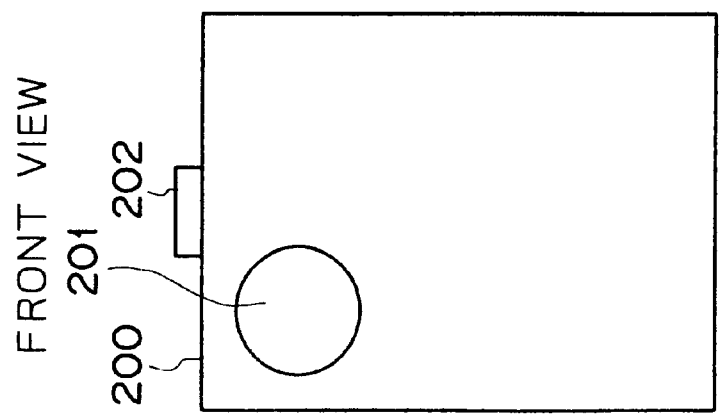
FIG. 4A FRONT VIEW
EXTERNAL VIEWS OF THE VIDEO CAMERA

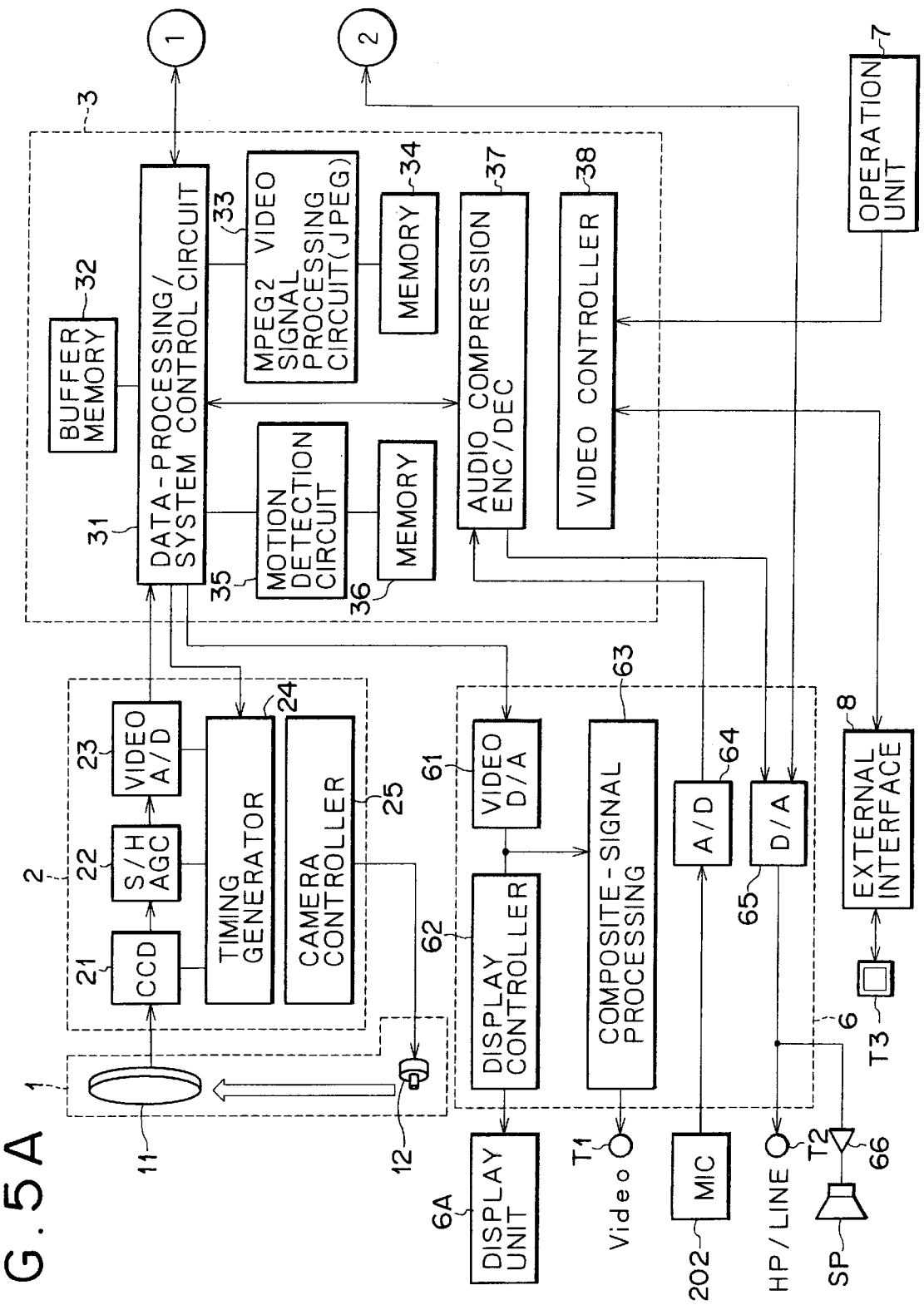

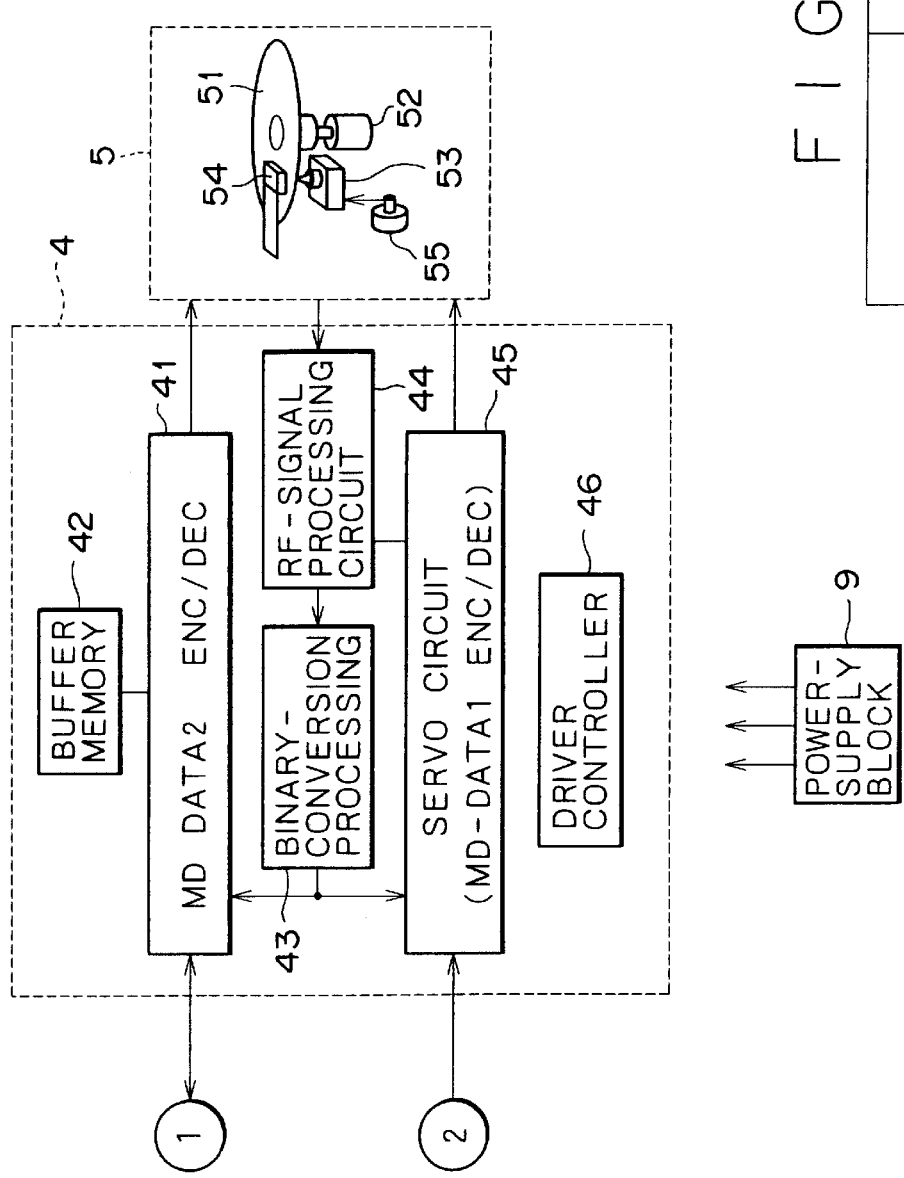

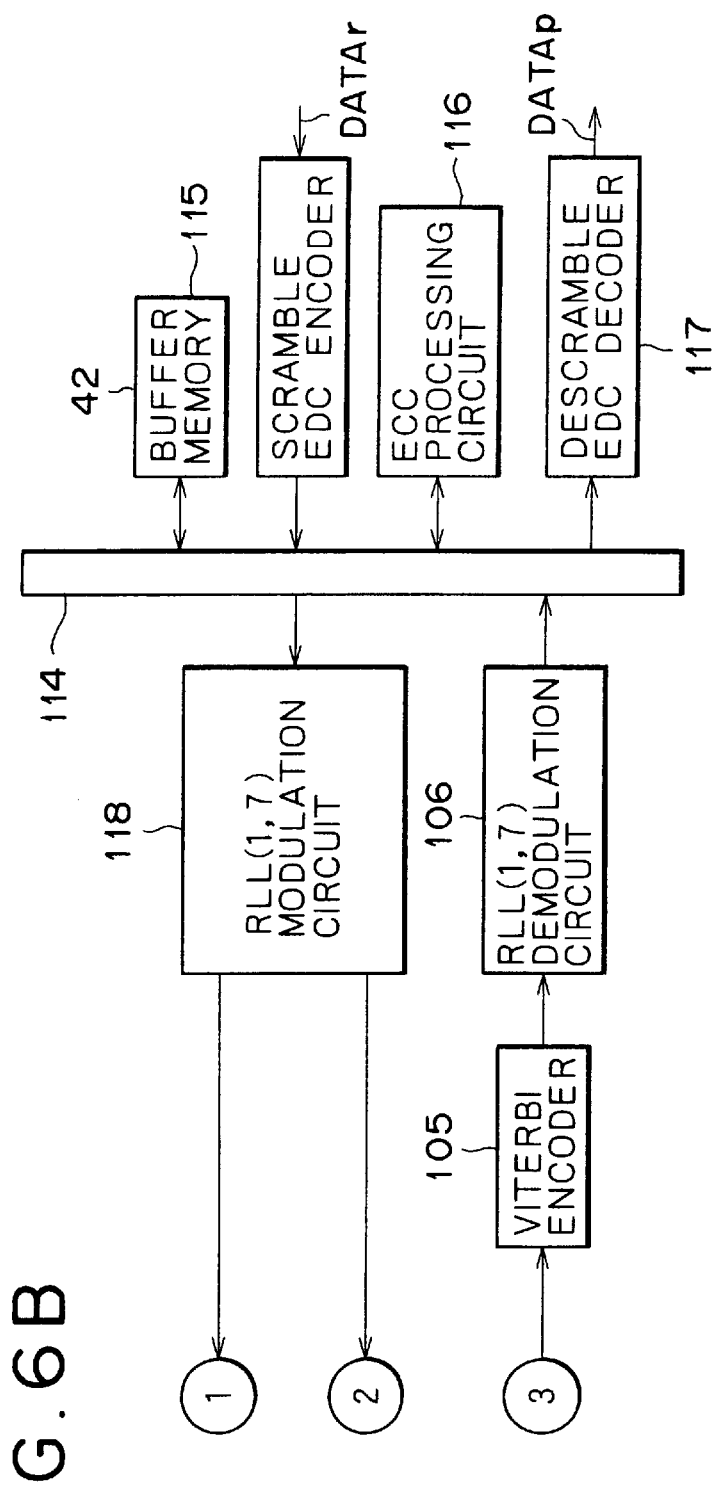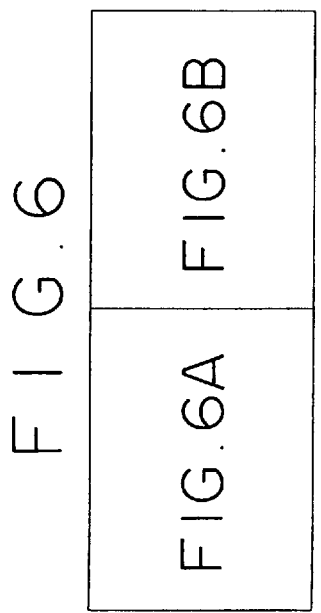

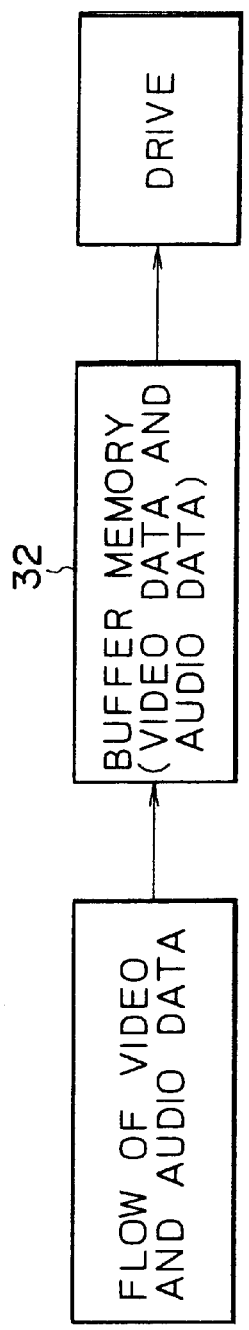
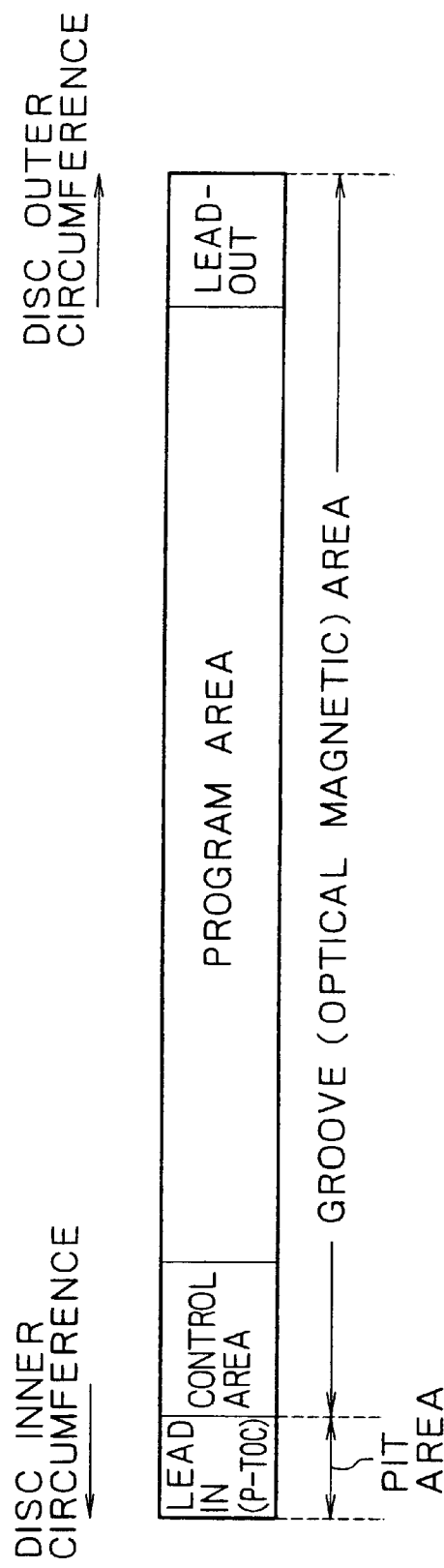

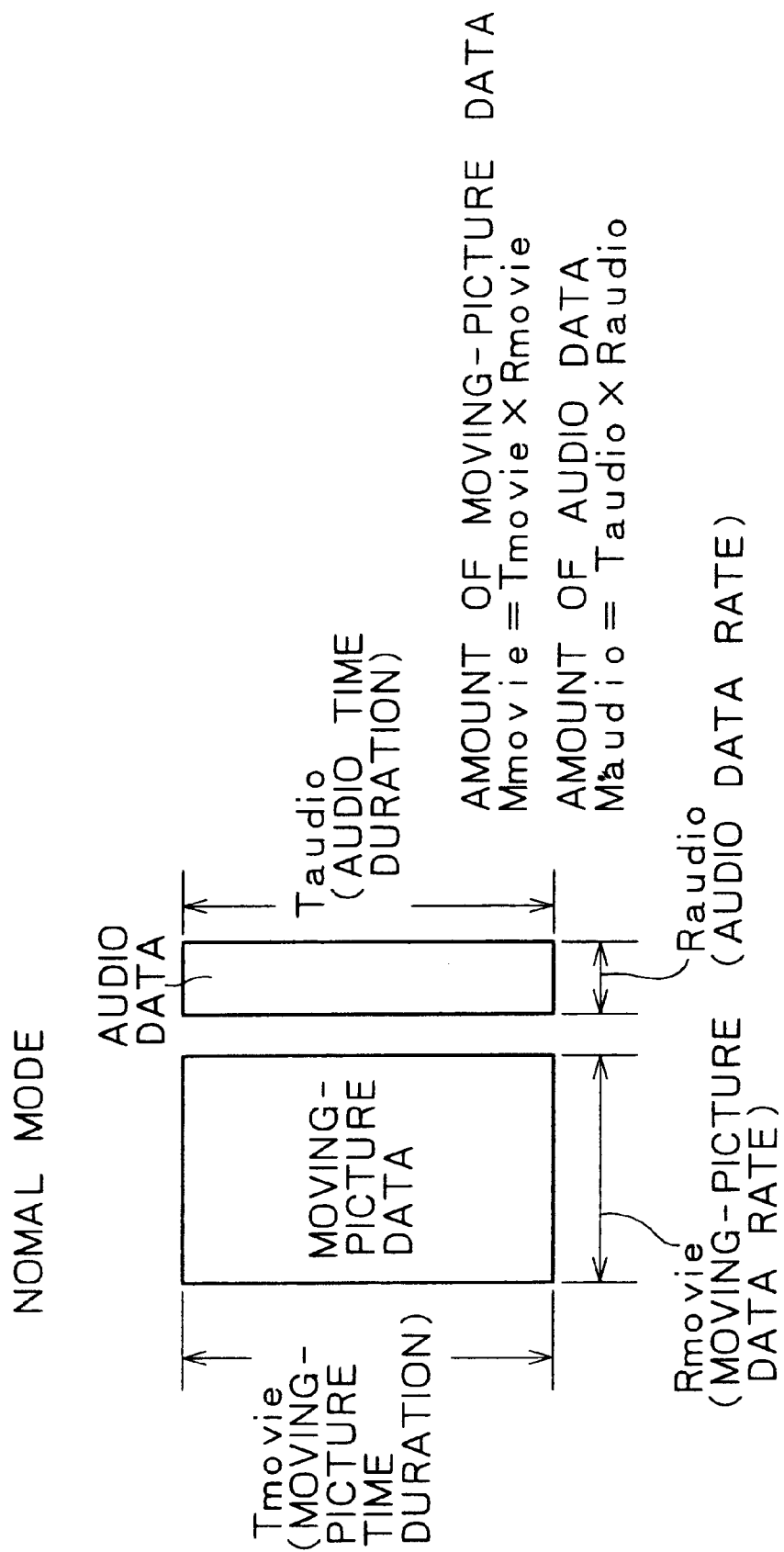

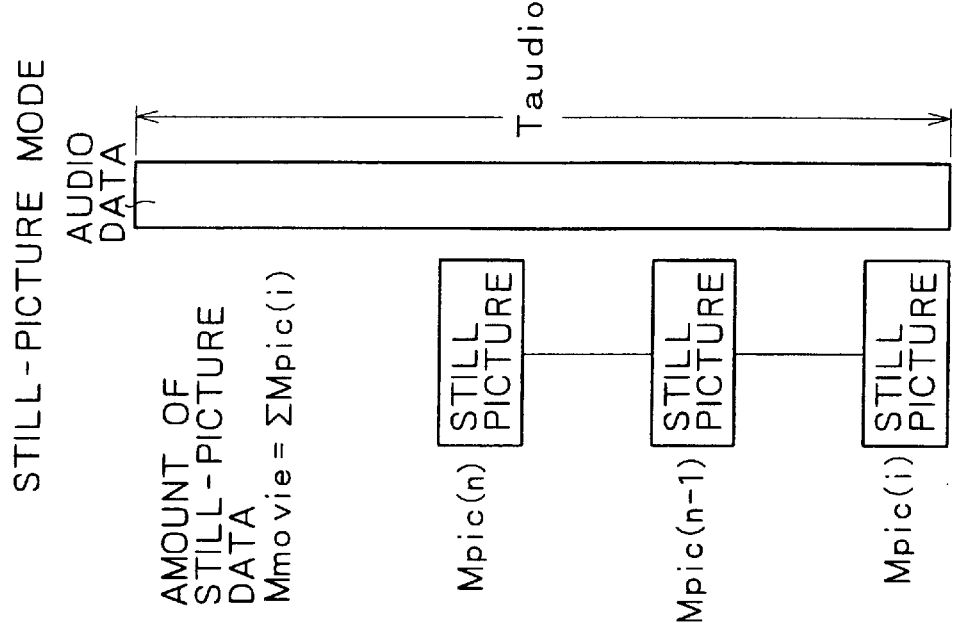
FIG. 8C STILL-PICTURE MODE
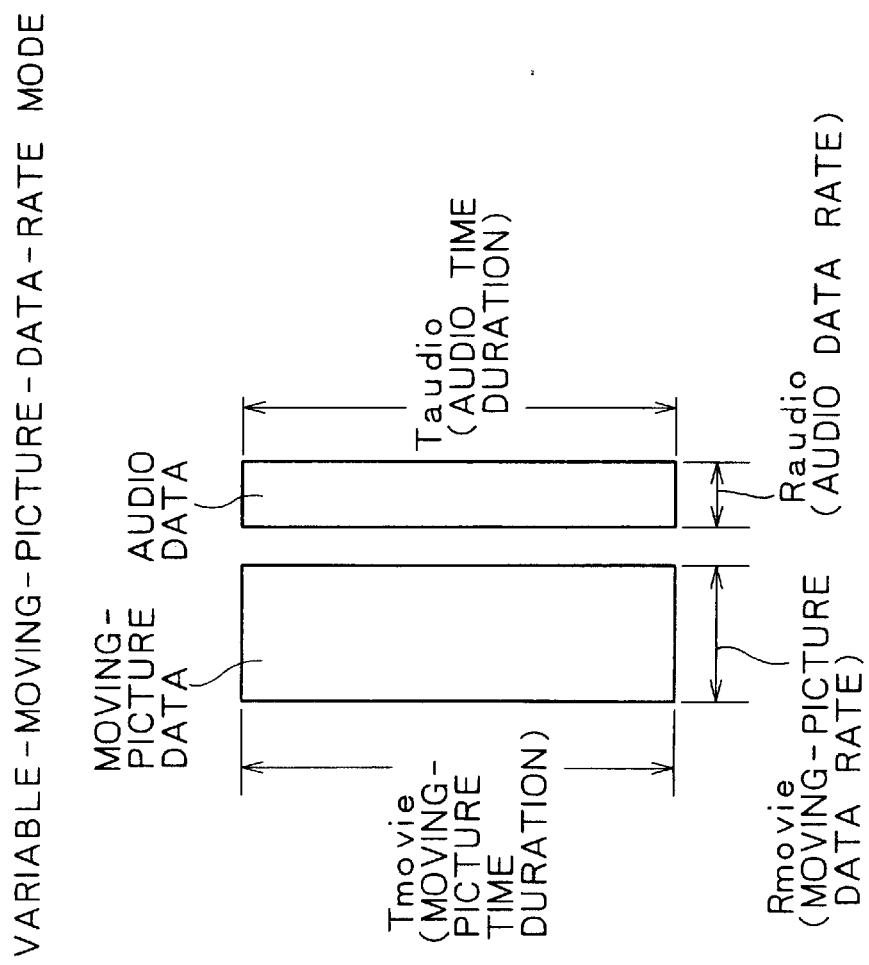
FIG. 8B VARIABLE-MOVING-PICTURE-DATA-RATE MODE

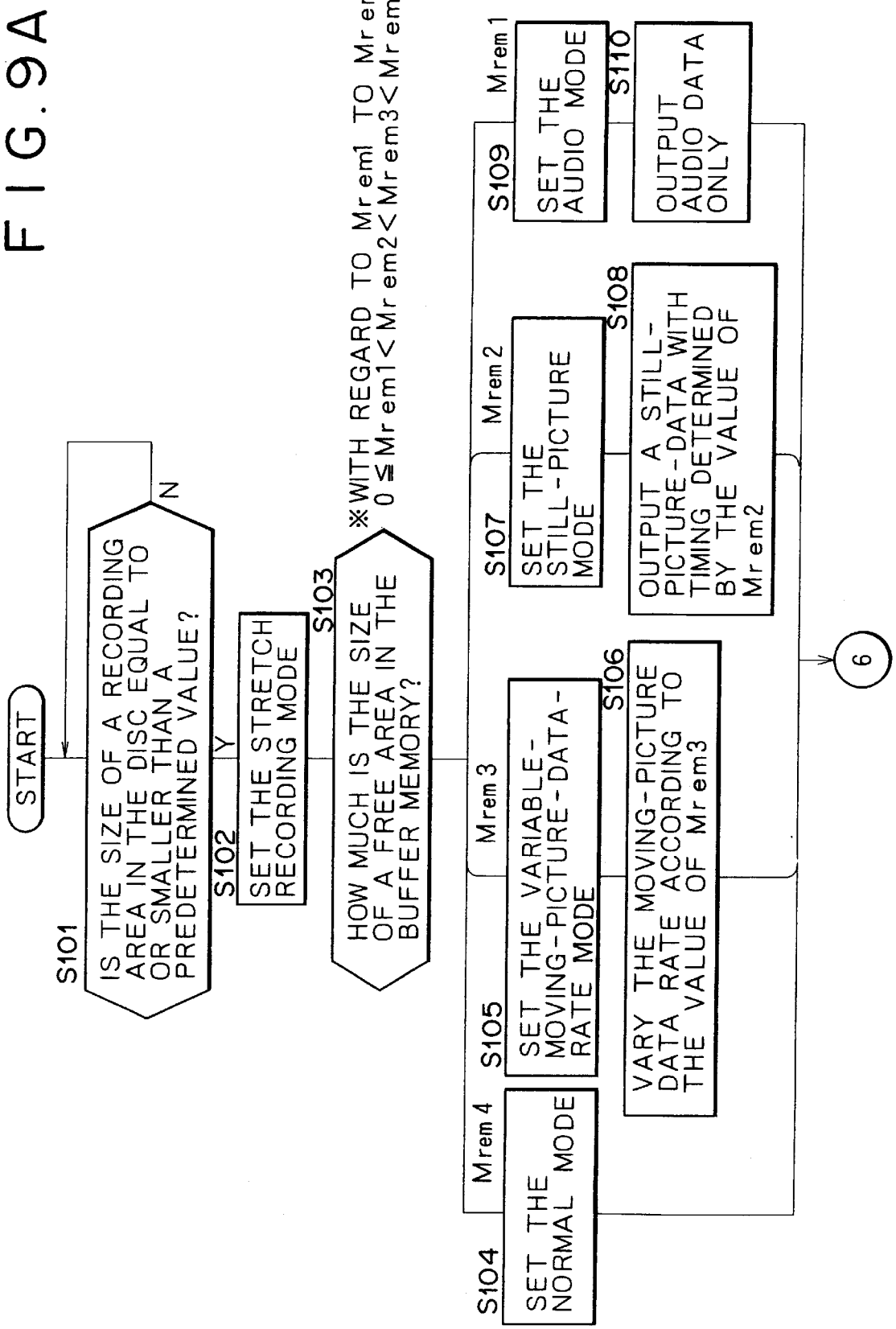

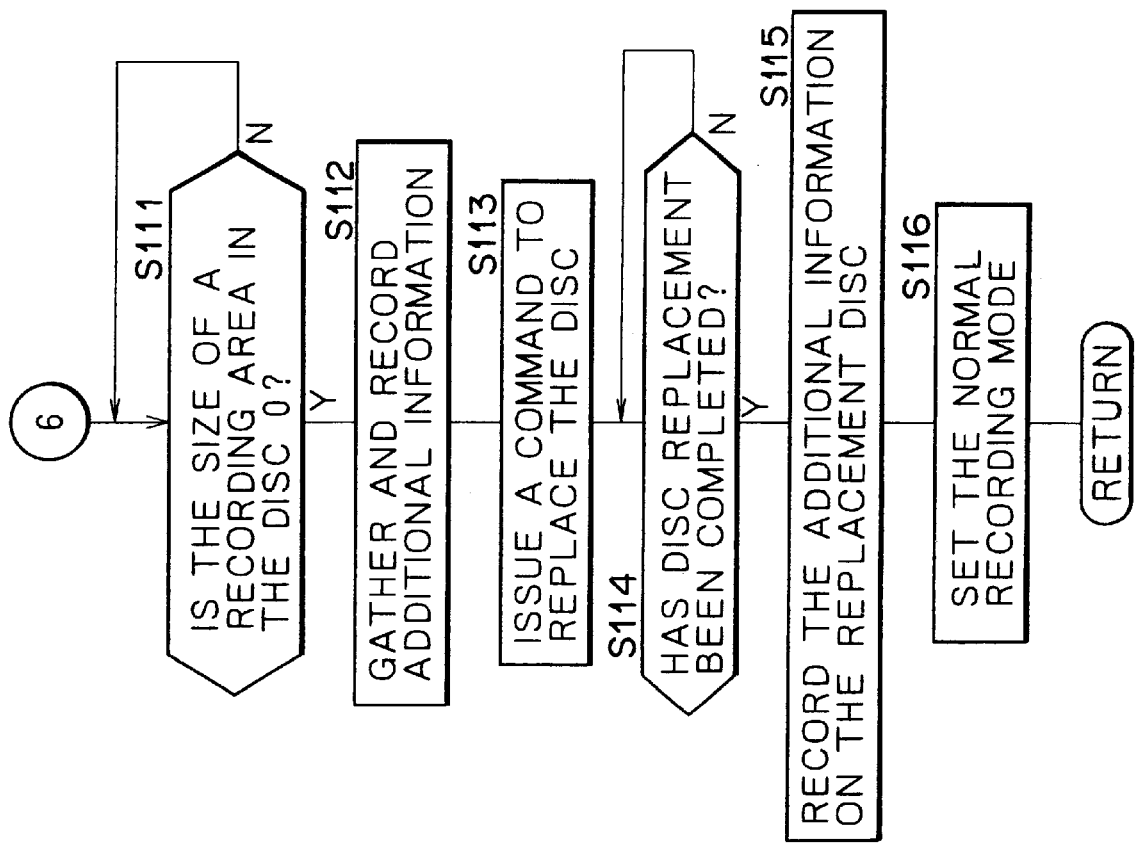

RECORDING APPARATUS, RECORDING/REPRODUCING APPARATUS AND RECORDING METHOD

BACKGROUND OF THE INVENTION

The present invention relates to a recording apparatus, a recording/reproducing apparatus and a recording medium capable of recording video-signal data and audio-signal data into a recording medium of a predetermined type, being well applicable to equipment such as a video camera.

At the present time, a video camera of a portable type, wherein an image shooting apparatus such as a camera and a video deck capable of recording and playing back video and audio data are integrated into a single body, is becoming widely popular.

In general, such a video camera employs a removable recording medium represented mainly by a videotape cassette. Normally, when the storage area of a recording medium mounted on the main body of such a video camera is almost all used up in the course of recording carried out by the user by utilizing the video camera, the recording is suspended temporarily, the recording medium mounted on the video camera is taken out, a new recording medium prepared in advance is mounted in place of the removed recording medium and the recording is resumed.

By the way, for example, during a period of time to replace a recording medium mounted on the video camera with another one in the course of the image shooting as described above, data can not be recorded into the recording medium. That is to say, when recording is carried out over a long period of time using a plurality of recording media, information that would be recorded into a recording medium during a period of time to replace the recording medium mounted on the video camera with another one is lost. As a result, continuity of recorded data along the time axis between 2 recording media can not be obtained in a strict sense.

Particularly, in recent years, promotion of efforts to increase the recording density of the disc recording medium is under way. With such promotion serving as a background, a video deck capable of recording and playing back video and audio data can be possibly employed in a video camera for a disc recording medium. If a disc recording medium is employed as a recording medium, operations such as random accesses can be carried out, so that, during playback processing for example, operations such as a scan, forward and rewind can be implemented at a higher speed.

In the present state of the art, however, a disc recording medium generally has a small storage capacity in comparison with a tape recording medium as before. In the case of a video camera in particular, the amount of video data of a moving picture is extremely large in comparison with information to be recorded such as audio data. Thus, in a video camera system employing a disc as a recording medium, the recording time per disc is expected to be relatively short. As a result, there are raised problems that, in the course of recording over a long period of time, the disc recording medium must be replaced more frequently and a ratio of time of losing data caused by replacement of the disc recording medium to the total recording time increases accordingly.

In addition, as is generally known, a recording/playback apparatus for driving a disc recording medium is generally more sensitive to vibration and shocks than a driver for driving a tape recording medium.

For this reason, when a variety of servo of a driver employed in a video camera for driving a disc used in the camera as a recording medium is out of control due to a cause such as vibration of the main body of the camera or a shock given to the main body during a recording operation using the camera for example, recording of data is interrupted. In such a circumstance, it is more certainly within the bounds of probability that continuity of recorded data along the time axis can not be obtained any more.

SUMMARY OF THE INVENTION

It is thus an object of the present invention addressing the problems described above to provide more convenience to the user of a video camera by sustaining as much continuity of recorded data between recording media along the time axis as possible even for a circumstance wherein recording of data into a recording medium employed in the camera can not be carried out physically due to, for example, replacement of the recording medium by another one in the course of recording using the camera.

In order to solve the problems described above, the present invention provides a recording apparatus characterized in that the apparatus comprises: a video compressing means for compressing input video data; an audio compressing means for compressing input audio data; a storage means for storing compressed video data generated by the video compressing means and compressed audio data generated by the audio compressing means; a recording means for reading out compressed video data and audio data temporarily stored in the storage means back from the storage means with predetermined timing and then recording the compressed video and audio data read out from the storage means into a recording medium; a storage-size detecting means for finding a storage-size of the storage means; and a storage-means control means for writing compressed audio data generated by the audio compressing means to be supplied to the storage means into the storage means at a priority higher than compressed video data generated by the video compressing means to be supplied to the storage means in accordance with a storage-size of the storage means found by the storage-size detecting means.

In addition, the present invention also provides a recording/reproducing apparatus characterized in that the apparatus comprises: a video compressing means for compressing input video data; an audio compressing means for compressing input audio data; a storage means for storing compressed video data generated by the video compressing means and compressed audio data generated by the audio compressing means; a storage-size detecting means for finding a storage-size of the storage means; a control means for controlling the video compressing means to thin compressed video data generated by the video compressing means in accordance with a storage-size of the storage means found by the storage-size detecting means so as to reserve an area in the storage means large enough for storing compressed audio data produced by the audio compressing means to be supplied to the storage means; an identifier generating means for generating an identifier used for identifying a control state of the control means; a recording means for reading out compressed video data, compressed audio data and the identifier generated by the identifier generating means to identify a control state of the control means temporarily stored in the storage means back from the storage means with predetermined timing and then recording the compressed video data, the compressed audio data and the identifier read out from the storage means into a recording medium; a reproducing means for reproducing compressed video data, compressed audio data and the identifier identifying a control state of the control means from the recording medium; a video decompressing means for decompressing compressed video data reproduced by the reproducing means; an audio decompressing means for decompressing compressed audio data reproduced by the reproducing means; and a video-decompressing-means control means for controlling decompression carried out by the video decompressing means in accordance with the identifier reproduced by the reproducing means.

Furthermore, the present invention also provides a recording method characterized in that the method comprises the steps of: compressing input video data; compressing input audio data; storing compressed video data and compressed audio data in a memory; finding a storage-size of the memory; writing compressed audio data supplied to the memory at a priority higher than compressed video data supplied to the memory in accordance with the storage-size of the memory; and reading out compressed video data and compressed audio data temporarily stored in the memory back from the memory with predetermined timing and then recording the compressed video and audio data read out from the memory into a recording medium.

BRIEF DESCRIPTION OF THE DRAWINGS

FIG. 1 is a model diagram used for explaining double spiral tracks on a disc used in the present invention;

FIG. 2 is a model diagram showing an enlarged portion of the double spiral tracks enclosed by a dashed line A shown in FIG. 1;

FIG. 3 is a table showing comparison of specifications of a format used in the present invention with those of the related art format;

FIG. 4A is a diagram showing a front view of the external appearance of a video camera to which the present invention is applied;

FIG. 4B is a diagram showing a rear view of the external appearance of the video camera to which the present invention is applied;

FIG. 4C is a diagram showing a side view of the external appearance of the video camera to which the present invention is applied;

FIGS. 5, 5A and 5B are block diagrams showing an internal configuration of the video camera to which the present invention is applied;

FIGS. 6, 6A and 6B are detailed block diagrams and showing a recording apparatus employed in the video camera to which the present invention is applied;

FIG. 7 is a model diagram showing a stream of video and audio data in the video camera to which the present invention is applied;

FIG. 8A is a model diagram showing a storage state of video and audio data stored in a buffer memory in a normal mode provided by the present invention;

FIG. 8B is a model diagram showing a storage state of video and audio data stored in the buffer memory in a variable-moving-picture-data-rate mode provided by the present invention;

FIG. 8C is a model diagram showing a storage state of video and audio data stored in a buffer memory in a still-picture mode provided by the present invention;

FIGS. 9, 9A and 9B show a flowchart representing a processing procedure provided by the present invention; and FIG. 10 is a model diagram showing a recording medium used in the present invention.

DESCRIPTION OF THE PREFERRED EMBODIMENTS

Figure 6A:
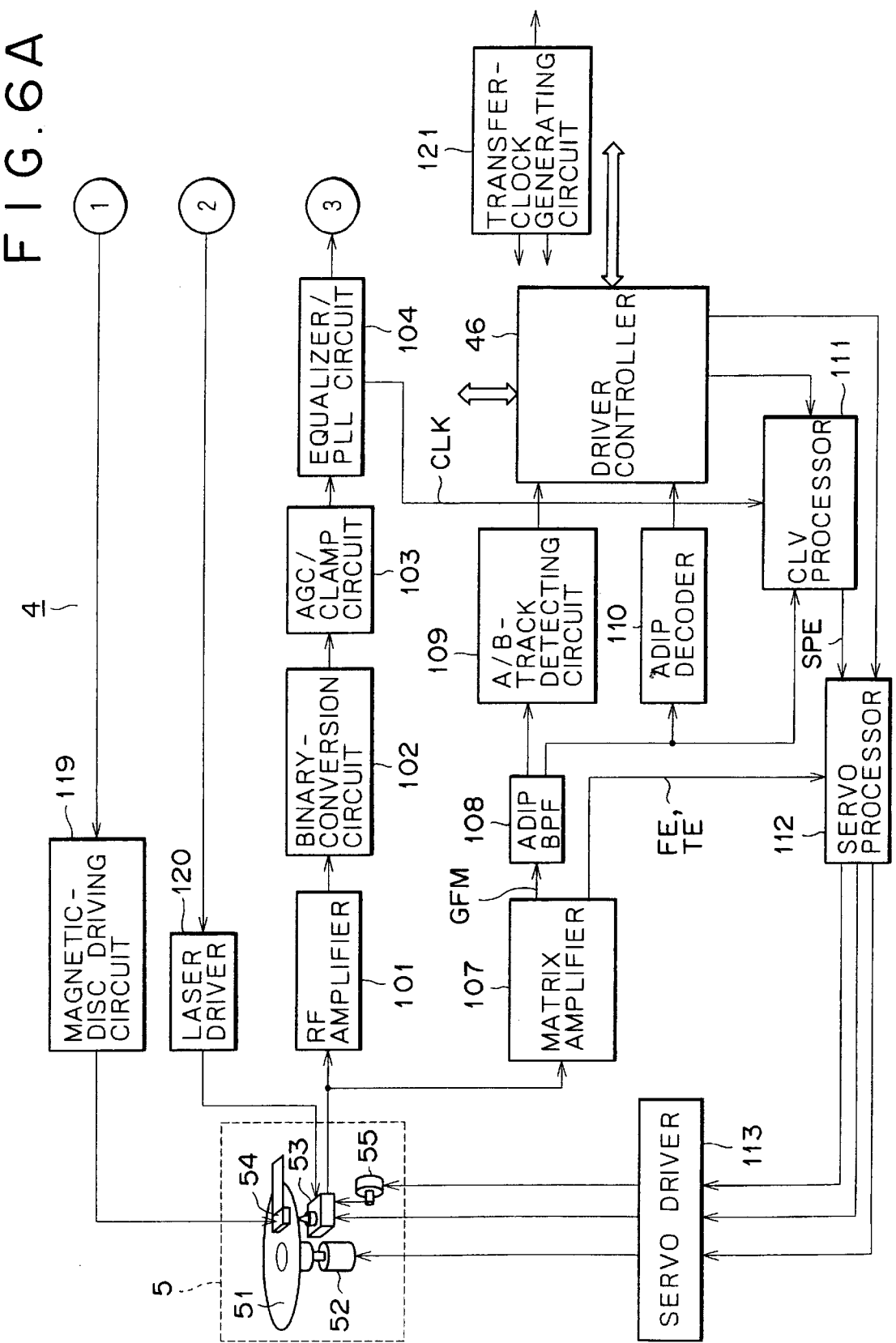

A recording apparatus implemented by an embodiment of the present invention is explained by referring to FIGS. 1 to 10. To be more specific, the embodiment implements a video camera of a portable type, wherein an image shooting apparatus and a recording/reproducing apparatus capable of recording and playing back video and audio data are integrated into a single body. The recording/reproducing apparatus mounted on the video camera provided by the embodiment is designed to execute functions of recording and playing back data into and from a so-called Mini Disc (trademark).

The video camera is explained in the following order.

1. Disc Format
2. Configuration of the Video Camera
3. Configuration of a Media Drive Unit
4. Operations in Stretched-Recording mode
4-1. Writing Data into a Buffer Memory
4-2. Recording of Additional Information
5. Processing Operations
6. Playback Operation 1. Disc Format The recording/reproducing apparatus mounted on the video camera provided by the embodiment is designed to execute functions of recording and playing back data having a so-called MD-data format into and from a mini disc. There have been developed two kinds of MD-data format, namely, MD-DATA1 and MD-DATA2. The video camera provided by this embodiment carries out recording and playback operations in the MD-DATA2 format which allows a recording operation to be performed at a recording density higher than MD-DATA1. For this reason, first of all, disc format of the MD-DATA2 is explained.

FIGS. 1 and 2 are diagrams each conceptually showing a typical structure of a track on a disc with the MD-DATA2 format. FIG. 2 is a diagram showing an enlarged cross section view of a portion enclosed by a dotted line A shown in FIG. 1.

As shown in these figures, on the surface of the disc, there are created two kinds of groove in advance, namely, a wobbled groove (WG) having wobble and a non-wobbled groove (NWG) with no wobble. Wobbled groove WG and non-wobbled groove NWG form double spirals on the disc which sandwich land Ld therebetween.

In the MD-DATA2 format, land Ld is used as a track. Since land Ld is provided between wobbled groove WG and non-wobbled groove NWG, there are two kinds of track, namely, tracks Tr•A and Tr•B. Tracks Tr•A and Tr•B are provided independently of each other, forming double spirals. To put it in detail, wobbled groove WG is located on the disc-outer-circumference side of track Tr•A and non-wobbled groove NWG is located on the disc-inner-circumference side of track Tr•A. On the other hand, non-wobbled groove NWG is located on the disc-outer-circumference side of track Tr•B and wobbled groove WG is located on the disc-inner-circumference side of track Tr•B. That is to say, wobble is provided only on the disc-outer-circumference side of track Tr•A and on the disc-inner-circumference side of track Tr•B.

In this case, a track pitch is a distance between the center of track Tr•A and the center of track Tr•B adjacent each other. The track pitch has a value of 0.95 $\mu$m as shown in FIG. 2.

Creation of the wobble on wobbled groove WG is based on a signal experiencing FM modulation and bi-phase modulation of encoded physical addresses on the disc. For this reason, by demodulating the reproducing information obtained from the wobbling provided on wobbled groove WG, a physical address on the disc can be extracted.

Address information included in wobbled groove WG is valid information common to tracks Tr•A and Tr•B. That is to say, track Tr•A on the disc-inner-circumference side of wobbled groove WG and track Tr•B on the disc-outer-circumference side of wobbled groove WG sandwiching wobbled groove WG share address information included in the wobble provided on wobbled groove WG. It should be noted that such an addressing system embraced by this embodiment is referred to as an interlace addressing system. By adoption of the interlace addressing system, for example, cross-talk between adjacent wobbled grooves can be suppressed and the track pitch can be reduced. A system wherein an address is recorded in wobble created on a groove is referred to as an ADIP (Address in Pregroove) system.

As described above, tracks Tr•A and Tr•B share the same address information. The following is a description of how to recognize which of the tracks is being traced.

Typically, a three-beam system is adopted. In this system, with a main beam used for tracing a track, that is, land Ld, the two remaining side beams are tracing the two grooves on both sides of the track.

In the example shown in FIG. 2, main-beam spot SPm is tracing track Tr•A. In this case, side-beam spot SPs1 on the disc-inner-circumference side is tracing non-wobbled groove NWG of track Tr•A while side-beam spot SPs2 on the disc-outer-circumference side is tracing wobbled groove WG of track Tr•A.

In another tracing state not shown in the figure, while main-beam spot SPm is tracing track Tr•B, side-beam spot SPs1 is tracing wobbled groove WG on the disc-inner-circumference side of track Tr•B and side-beam spot SPs2 is tracing non-wobbled groove NWG on the disc-outer-circumference side of track Tr•B.

As described above, grooves NWG and WG traced by side-beam spots SPs1 and SPs2 respectively while main-beam spot SPm is tracing track Tr•A are deliberately swapped with grooves WG and NWG traced by side-beam spots SPs1 and SPs2 respectively while main-beam spot SPm is tracing track Tr•B.

A photo detector detecting a beam reflected from side-beam spot SPs1 or SPs2 generates a detection signal with a different waveform which indicates whether the side-beam spot is currently tracing wobbled groove WG or non-wobbled groove NWG. That is to say, the detection signal can be used as a base for determining whether side-beam spot SPs1 or SPs2 is currently tracing wobbled groove WG or non-wobbled groove NWG. As a result, it is possible to recognize which track of Tr•A and Tr•B is currently being traced by the main beam.

FIG. 3 is a table showing comparison of major specifications of the MD-DATA2 format having the track structure described above with those of the MD-DATA1 format.

In the first place, according to the MD-DATA1 format, the track pitch is 1.6 $\mu$m, the bit length is 0.5 $\mu$m/bit, the laser wavelength $\lambda$ is 780 nm and the numerical aperture NA of the optical head is 0.45.

A groove recording system is adopted. In the groove recording system, data is recorded onto and played back from a groove.

A wobbled groove is used in an addressing system wherein a groove is created as a single spiral and wobble including address information is formed on each side of the groove.

An EFM (Eight-Fourteen modulation) system is adopted as a system for modulating data to be recorded and an ACIRC (Advanced Cross Interleave Reed-Solomon Code) system is adopted as an error correction technique. A convolution type is used in data interleaving. Thus, data redundancy is 46.3%.

In the MD-DATA1 format, a CLV (Constant Linear Velocity) technique is adopted as a disc driving system. The linear velocity in the CLV technique is 1.2 m/s.

The standard data rate in recording and playback operations is 133 kB/s and the storage capacity is 140 B.

In the MD-DATA2 format, on the other hand, the track pitch is 0.95 $\mu$m and the bit length is 0.39 $\mu$m/bit. Both the track pitch and the bit length are obviously smaller than those of the MD-DATA1 format. In order to implement the bit length described above, the laser wavelength $\lambda$ is set at 650 nm and the numerical aperture NA of the optical head is set at 0.52. In this way, the diameter of the beam spot at the focus position is reduced and the band of the optical system is widened.

As having been described by referring to FIGS. 1 and 2, the land recording system and the interlace addressing system are adopted.

As a system for modulating data to be recorded, an RLL (1, 7) system suitable for high-density recording, where RLL is an abbreviation for Run Length Limited, is adopted. As an error correction method, an RS-PC (Read Solomon Product Code) system is adopted and, as a data interleaving technique, a block closed type is adopted. As a result of adopting the above systems, techniques and methods described above, redundancy of data can be suppressed to 19.7%.

Also in the MD-DATA2 format, a CLV (Constant Linear Velocity) technique is adopted as a disc driving system. The linear velocity in the CLV technique is 2.0 m/s. The standard data rate in recording and playback operations is 589 kB/s and a storage capacity of 650 MB can be obtained. A recording density four times as high as that of the MD-DATA1 format can be implemented.

In the case of data of a moving picture subjected to an MPEG2 (Moving Picture Experts Group II) compression/encoding process in an operation to record the moving picture in accordance with the MD-DATA2 format, for example, a moving picture of 15 to 17 minutes long can be recorded regardless the bit rate of the encoded data. In the case of an audio-signal subjected to an ATRAC2 (Adaptive Transform Acoustic Coding 2) compression process in an operation to record the data of the audio-signal only, an audio-signal of about 10 hours long can be recorded. In comparison with ATRAC1 compression, the ATRAC2 compression increases compressibility to such a value that the bit rate is ½ or ¼ of that of ATRAC1.

2. Configuration of the Video Camera

FIGS. 4A, 4B and 4C are diagrams showing front, back and side views of a typical external appearance of a video camera provided by the embodiment.

As shown in FIGS. 4A to 4C, on a front face of a main body 200 of the video camera provided by the embodiment, a camera lens 201 having an image pickup lens for image shooting and a diaphragm is provided in a posture protruding out off the front face. A microphone 202 for picking up audio from external sources in the course of image shooting is typically provided on the upper surface of the main body 200. Thus, the video camera is capable of video-recording pictures taken by the camera lens 201 and audio-recording sound picked up by the microphone 202.

On the rear surface of the main body 200, a display unit 6A, an operation unit 7 and a speaker SP are provided. The display unit 6A serves as a member for outputting and displaying information such as a shot picture or a picture played back by an internal recording/reproducing apparatus. It should be noted that, as a display device practically serving as the display unit 6A, a liquid-crystal display device is typically employed, though not limited to a liquid-crystal display device in particular. The display unit 6A is also used for displaying a message described typically in terms of characters and figures to notify the user of necessary information on the operation of the video camera.

The operation unit 7 is a panel member provided with a set of keys to be used by the user for carrying out a variety of operations. In the case of a video camera like this instance, the keys typically include a video-recording start key for starting an operation to shoot image, a video-recording stop key for ending an operation to shoot image and a variety of playback keys such as a playback key, a search key, a forward key and a rewind key for carrying out operations to play back data recorded on a disc 51. A speaker SP is used for reproducing/outputting recorded sound by the internal recording/reproducing apparatus. The speaker SP also generates a prescribed audio message such as beep sound.

On the side surface of the main body 200 of the video camera, a disc slot 203 and an I/F (Interface) terminal T3 are provided. A disc used as a recording medium for the video camera provided by the embodiment is inserted into or ejected from the video camera through the disc slot 203. The I/F terminal T3 serves as an input/output terminal of an interface for exchanging data with typically external data equipment.

It should be noted that the external appearance of the video camera shown in FIG. 4 is typical to the last. In actuality, the external appearance can be properly modified in accordance with usage conditions required by the video camera implemented by the embodiment.

FIGS. 5, 5A and 5B are block diagrams showing a typical internal configuration of the video camera provided by the embodiment.

In actuality, a lens block 1 shown in the figure includes typically an optical system 11 comprising components such as an image pickup lens and a diaphragm. The camera lens 201 shown in the external appearance of FIG. 4 is included in this optical system 11. The lens block 1 also has an auto-focus function for implementing an auto-focus operation of the optical system 11 by means of a focus motor 12.

A camera block 2 includes a circuit for converting a picture light shot mainly by the lens block 1 into a digital video-signal.

To put it in detail, an optical picture of a shooting object passing through the optical system 11 is supplied to a CCD (Charge Coupled Device) 21 of the camera block 2. In the CCD 21, the optical picture is subjected to opto-electrical conversion to produce a image shooting signal supplied to a sample-hold/AGC (Automatic Gain Control) circuit 22. In the sample-hold/AGC circuit 22, the shooting signal supplied by the CCD 21 is subjected to gain adjustment and sample-hold processing to shape the waveform of the signal. A signal output by the sample-hold/AGC circuit 22 is supplied to a video A/D converter 23 for converting the signal into video-signal digital data.

Timings of pieces of signal processing carried out by the CCD 21, the sample-hold/AGC circuit 22 and the video A/D converter 23 are controlled by timing signals generated by a timing generator 24. The timing generator 24 inputs a clock signal used as a base for generating prescribed timing signals. The clock signal is also used in signal processing carried out by a data-processing/system control circuit 31 employed in a video-signal processing unit 3 to be described later. Thus, the timings of the pieces of signal processing carried out by the camera block 2 can be synchronized with timing of the signal processing carried out by the video-signal processing unit 3.

A camera controller 25 executes necessary control to properly operate a variety of functional circuits employed in the camera block 2 and controls, among other things, the auto-focus function, automatic exposure adjustment, diaphragm adjustment and zooming operations of the lens block 1. In the case of auto-focus control, for example, the camera controller 25 controls the rotational angle of the focus motor 12 on the basis of focus-control information obtained in accordance with a predetermined auto-focus control system. In this way, the image pickup lens can be driven into a just-pint state.

The video-signal processing unit 3 compresses a digital video-signal supplied by the camera block 2 and a digital audio-signal generated from sound picked up by the microphone 202, and supplies data obtained as a result of the compression to a media drive unit 4 at a later stage as user recording data in a recording operation. In a playback operation, on the other hand, compressed video-signal data and audio-signal data read out from a disc 51 are supplied to the video-signal processing unit 3 by the media drive unit 4, that is, compressed and encoded video and audio-signal data, is demodulated to produce playback video and audio-signals.

It should be noted that, as a compression/decompression system of video-signal data, the embodiment adopts the MPEG2 (Moving Picture Experts Group 2) technique for moving pictures and the JPEG (Joint Photographic Coding Experts Group) technique for still-pictures. As for the compression/decompression system of audio-signal data, the ATRAC2 (Adaptive Transform Acoustic Coding) 2 technique is adopted.

The data-processing/system control circuit 31 employed in the video-signal processing unit 3 mainly controls the compression and decompression of video-signal and audio-signal data in the video-signal processing unit 3 and executes processing to input and output data to and from the video-signal processing unit 3. Processing to control the entire video-signal processing unit 3 including the data-processing/system control circuit 31 is carried out by a video controller 38 which is implemented typically by a micro-computer. The camera controller 25 employed in the camera block 2 is capable of communicating with a driver controller 46 employed in a media drive unit 4 to be described later through typically a bus line which is not shown in the figure.

In a basic recording operation of the video-signal processing unit 3, the data-processing/system control circuit 31 receives video-signal data supplied by the A/D converter 23 employed in the camera block 2. In the data-processing/system control circuit 31, the input video-signal data is supplied typically to a motion detecting circuit 35 to be subjected to picture processing such as motion compensation using typically a memory 36 as a working area. The video-signal data completing the picture processing in the motion detecting circuit 35 is then supplied to an MPEG2 video-signal processing circuit 33.

In the MPEG2 video-signal processing circuit 33, the video-signal data supplied thereto is compressed in accordance with an MPEG2 format with typically a memory 34 used as a working area to produce a bit stream, strictly speaking, an MPEG2 bit stream, of compressed data of the moving picture. In addition, in the MPEG2 video-signal processing circuit 33 provided by the embodiment, data of still-pictures is extracted from the video-signal data of the moving picture and compressed to generate compressed data of the still-pictures with the JPEG format. It should be noted that, instead of carrying out this compression into the JPEG format, regular video data of an I (intra) picture included in the compressed video data having the MPEG2 format can be treated as data of a still-picture.

The compressed video-signal data obtained as a result of the compression and encoding process carried out by the MPEG2 video-signal processing circuit 33 is written into typically a buffer memory 32 at a predetermined data transfer rate to be stored therein temporarily.

The MPEG2 format supports both a CBR (Constant Bit Rate) and a VBR (Variable Bit Rate) as an encoding bit rate or a data rate as is generally known. Particularly in this embodiment, at least in a stretched-recording mode, video-signal data is compressed and encoded at a VBR, that is, at a bit rate which is changed in accordance with the size of a free area left in the buffer memory 32 as will be described later.

Audio picked up typically by the microphone 202 is converted by an A/D converter 64 employed in a display/video/audio I/O (Input and Output) unit 6 into digital audio-signal data which is then supplied to an audio compression encoder/decoder 37.

The digital audio-signal data is compressed by the audio compression encoder/decoder 37 in accordance with the ATRAC2 format mentioned earlier. The compressed audio-signal data is then written by the data-processing/system control circuit 31 into the buffer memory 32 at a predetermined data transfer rate to be stored therein temporarily.

As described above, compressed video data and compressed audio-signal data are stored into the buffer memory 32. The buffer memory 32 mainly plays a role of absorbing a difference in data transfer rate between two data transfers, namely, the data transfer rate between the camera block 2 or the display/video/audio I/O unit 6 and the buffer memory 32 and the data transfer rate between the buffer memory 32 and the media drive unit 4.

In a recording operation, the compressed video data and the compressed audio-signal data accumulated in the buffer memory 32 in the aforementioned manner are read out sequentially with predetermined timings and transferred to an MD-DATA2 encoder/decoder 41 employed in the media drive unit 4. It should be noted that, in a playback operation, for example, a sequence of recording operations ranging from the operation to read out data accumulated in the buffer memory 32 from the buffer memory 32 to an operation to record the data read out from the buffer memory 32 into the disc 51 mounted on the deck unit 5 by way of the media drive unit 4 are inevitably carried out intermittently.

Such operations to write data into and read out data from the buffer memory 32 are controlled typically by the data-processing/system control circuit 31.

A playback operation carried out by the video-signal processing unit 3 is explained in a simple and plain manner as follows.

In a playback operation, encoded compressed video data and compressed audio-signal data read out from the disc 51 are decoded by the MD-DATA2 encoder/decoder 41 employed in the media drive unit 4 to generate decoded compressed video data and compressed audio-signal data which are then supplied to the data-processing/system control circuit 31.

The data-processing/system control circuit 31 typically temporarily stores the compressed video data and the compressed audio-signal data supplied thereto in the buffer memory 32 temporarily. The compressed video data and compressed audio-signal data are then read out back from the buffer memory 32 with appropriate timing and at a proper data transfer rate so as to obtain matching along the playback time axis. The compressed video data read out back from the buffer memory 32 is then supplied to the MPEG2 video-signal processing circuit 33 whereas the compressed audio-signal data is fed to the audio compression encoder/decoder 37.

The MPEG2 video-signal processing circuit 33 decompresses the compressed video data supplied thereto and transfers decompressed video data obtained as a result of the decompression to the data-processing/system control circuit 31. The data-processing/system control unit 31 supplies the decompressed video-signal data to a video D/A converter 61 employed in the display/video/audio I/O unit 6.

In the audio compression encoder/decoder 37, on the other hand, the compressed audio-signal data transferred thereto is decompressed and then supplied to a D/A converter 65 employed in the display/video/audio I/O unit 6.

In display/video/audio I/O unit 6, the video D/A converter 61 converts the video-signal data transferred thereto into an analog video-signal which is then split and supplied to a display controller 62 and a composite-signal processing circuit 63.

The display controller 62 drives the display unit 6A in accordance with the video-signal supplied to the display controller 62. As a result, a playback picture appears on the display unit 6A. On the display unit 6A, not only can a picture played back from the disc 51 be displayed, but it is of course possible to output and display a picture obtained as a result of image shooting by a camera member comprising the lens block 1 and the camera block 2 in all but a real-time manner.

In addition to a picture played back from the disc 51 and a picture obtained as a result of image shooting by the camera member, the display unit 6A is also capable of displaying a message expressed typically in terms of characters and figures to inform the user of necessary information on the operating state of the video camera as described earlier. An operation to display such a message is controlled by typically the video controller 38 so that required elements such as characters and figures composing the message are displayed at desired positions. To put it in detail, video-signal data of the required elements such as characters and figures composing the message is mixed with video-signal data to be output by the data-processing/system control circuit 31 to the video D/A converter 61 in such a way that the elements are displayed at the desired positions.

The composite-signal processing circuit 63 converts the analog video-signal supplied thereto by the video D/A converter 61 into a composite signal output to a video output terminal T1. Typically, by connecting external equipment such as a monitor to the video output terminal T1, a picture played back by the video camera can be displayed on the external monitor.

In the display/video/audio I/O unit 6, on the other hand, the audio-signal data supplied to the D/A converter 65 by the audio compression encoder/decoder 37 is converted by the D/A converter 65 into an analog audio-signal for outputting to a headphone/line terminal T2. The analog audio-signal output by the D/A converter 65 is split and output to the speaker SP by way of an amplifier 66. As a result, the speaker SP generates an output such as playback sound. It should be noted that, since the explanation of the A/D converter 64 is included in the description of the recording operation, it is not necessary to repeat the explanation here.

Main functions of the media drive unit 4 are described as follows. In a recording operation, user data to be recorded with the MD-DATA2 format is encoded into code appropriate for disc recording and transferred to the deck unit 5. In a playback operation, on the other hand, data read out from the disc 51 mounted on the deck unit 5 is decoded to produce playback user data which is then transferred to the video-signal processing unit 3.

In a recording operation, the MD-DATA2 encoder/decoder 41 employed in the media drive unit 4 receives recording data to be recorded from the data-processing/system control circuit 31 and carries out a predetermined encoding process on the recording data comprising compressed video data and compressed audio-signal data in accordance with the MD-DATA2 format. The encoded data is then stored in a buffer memory 42 temporarily to be read out later while being transferred to the deck unit 5 with proper timing.

In a playback operation, on the other hand, the MD-DATA2 encoder/decoder 41 inputs a digital playback signal read out from the disc 51 and supplied thereto by way of an RF-signal processing circuit 44 and a binary-conversion circuit 43, decoding the digital playback signal in accordance with the MD-DATA2 format. Playback user data obtained as a result of the decoding is transferred to the data-processing/system control circuit 31 employed in the video-signal processing unit 3.

It should be noted that, also in a playback operation, the playback user data is once stored in the buffer memory 42, if necessary, to be read out back with proper timing and transferred to the data-processing/system control circuit 31. Operations to write and read out data into and from the buffer memory 42 are controlled by the driver controller 46.

It is worth noting that, during an operation to play back data from the disc 51, the servo or other mechanisms may be out of control due to causes such as an external disturbance, making it no longer possible to read out a signal from the disc 51. Even in such a circumstance, however, the continuity of playback data along the time axis can be sustained provided that the operation to play back data from the disc 51 can be restored to a normal state as long as data to be read out is yet stored in the buffer memory 42.

The RF-signal processing circuit 44 carries out necessary processing on a signal read out from the disc 51 to generate, for example, a playback data signal as an RF signal and a variety of servo-control signals for controlling the servo of the disc 51 such as a focus-error signal and a tracking-error signal. The RF signal is converted by the a binary-conversion circuit 43 into binary data which is then supplied to the MD-DATA2 encoder/decoder 41 as digital-signal data.

The same variety of servo-control signals generated by the RF-signal processing circuit 44 are supplied to a servo circuit 45 for executing necessary servo control in the deck unit 5 based on the servo-control signals supplied thereto.

It should be noted that the servo circuit 45 provided by the embodiment has a functional circuit that functions as an encoder/decoder for the MD-DATA1 format. This functional circuit is capable of encoding user recording data supplied thereto from the video-signal processing unit 3 in accordance with the MD-DATA1 format and decoding data, which was encoded in the MD-DATA1 format in advance, being read out from the disc 51 to be transferred to the video-signal processing unit 3. That is to say, the video camera implemented by the embodiment is designed to provide compatibility between the MD-DATA2 format and the MD-DATA1 format.

A driver controller 46 serves as a functional circuit for totally controlling the media drive unit 4.

The deck unit 5 is a member provided with a mechanism for driving the disc 51. To be more specific, the deck unit 5 includes a mechanism, that is, the disc slot 203 of FIG. 4 which allows the disc 51 for the deck unit 5 to be mounted onto and dismounted from the deck unit 5. Not shown in FIGS. 5, 5A and 5B, the disc slot 203 thus allows the user to replace the mounted disc 51 with another one. The disc 51 is assumed to be an optical magnetic disc conforming to the MD-DATA1 or MD-DATA2 format.

In the deck unit 5, the mounted disc 51 is driven into rotation by a spindle motor 52 at a CLV. During a recording or playback operation, an optical head 53 irradiates a laser beam to the disc 51.

In a recording operation, the optical head 53 generates a laser output at a level high enough for heating the recording track on the disc 51 to a Curie temperature. In a playback operation, on the other hand, the optical head 53 generates a laser output at a relatively low level for detecting data from a light reflected by the disc 51 by a magnetic Kerr effect. Not explicitly shown in detail in FIGS. 5, 5A and 5B, the optical head 53 has components mounted thereon. The mounted components are an optical system comprising a laser diode, a polarization beam splitter and an objective lens, and a detector for detecting the reflected light. The objective lens mounted on the optical head 53 is held by a dual-axis mechanism in such a way that the objective lens can be displaced in the radial direction of the disc 51 and in a direction departing from or approaching the disc 51.

A magnetic head 54 is installed on the other side of the disc 51 with respect to the optical head 53 at a counterpart position to the position of the optical head 53. The magnetic head 54 applies a magnetic field modulated by recording data to the disc 51.

The deck unit 5 also has a sled mechanism driven by a sled motor 55. The sled mechanism itself is not shown in FIG. 5 though. By driving the sled mechanism, the entire optical head 53 and the optical head 54 can be moved in the radial direction of the disc 51.

As explained earlier by referring to FIG. 4, the operation unit 7 is provided with a set of keys for use by the user to carry out a variety of operations.

An external interface unit 8 allows data to be exchanged between this video camera with external equipment. The external interface unit 8 is typically provided between an I/F terminal T3 and the video-signal processing unit 3 as shown in the figure. The external interface unit 8 is typically designed to conform to the IEEE1394 standard even though the external interface unit 8 is not necessarily limited to this standard.

Assume, for example, that an external digital video apparatus is connected to the video camera implemented by the embodiment through the I/F terminal T3. In this case, a picture and/or audio picked up by the video camera can be recorded in the external digital video apparatus. In addition, a signal such as video and audio data played back by the external digital video apparatus can be supplied to the video camera by way of the external interface unit 8 to be recorded into the disc 51 in accordance with the MD-DATA2 or MD-DATA1 format.

A power-supply block 9 supplies direct-current power generated by an embedded battery or generated from commercial alternating-current power to a variety of functional circuits at appropriate voltage levels.

3. Configuration of the Media Drive Unit

FIGS. 6, 6A and 6B are block diagrams showing a detailed configuration of MD-DATA2 functional circuits employed in the media drive unit 4 shown in FIGS. 5, 5A and 5B. It should be noted that, while FIGS. 6, 6A and 6B also show the deck unit 5 together with the media drive unit 4, the explanation of the internal configuration of the deck unit 5 is not repeated since its internal configuration has been explained earlier by referring to FIGS. 5, 5A and 5B. In FIGS. 6A and 6B, components of the deck unit 5 are denoted by the same reference numerals used in FIGS. 5, 5A and 5B. By the same token, components of the media drive unit 4 shown in FIGS. 6, 6A and 6B identical with those shown in FIGS. 5, 5A and 5B are denoted by the same reference numerals as the latter.

When the optical head 53 radiates light onto the disk 51, an optical current obtained by the photo detector employed in the optical head 53, as a result of detection of a reflected laser light, is supplied to the RF amplifier 101.

The RF amplifier 101 generates a playback RF signal representing a playback signal from the detected information supplied thereto, then outputs the playback RF signal to the binary-conversion circuit 102, that is, the binary-conversion circuit 43 shown in FIGS. 5, 5A and 5B are The binary-conversion circuit 43 converts the playback RF signal into a binary RF signal or a digital playback RF signal.

The binary RF signal is subjected to processes such as gain adjustment and clamp processing in an AGC/clamp circuit 103 before being supplied to an equalizer/PLL circuit 104.

The equalizer/PLL circuit 104 carries out an equalizing process on the binary RF signal supplied thereto, then outputs the result to a Viterbi decoder 105. In addition, by supplying the binary RF signal completing the equalizing process to a PLL circuit, a clock signal CLK synchronized with the binary RF signal (a train of RLL (1, 7) codes) can be obtained.

The frequency of the clock signal CLK represents the current rotational speed of the disc 51. Thus, a CLV processor 111 inputs the clock signal CLK from the equalizer/PLL circuit 104 and compares the frequency of the clock signal CLK with a reference value representing a predetermined CLV shown in the table of FIG. 3 to produce error information which is used as a signal component for generating a spindle-error signal SPE. In addition, the clock signal CLK is also used as a clock signal of processing carried out by a variety of signal-processing circuits such as an RLL (1, 7) demodulation circuit 106.

The Viterbi decoder 105 decodes the binary RF signal supplied thereto from the equalizer/PLL circuit 104 by adopting a so-called Viterbi decoding method to produce a train codes of RLL (1, 7) (Run Length Limited) representing playback data.

This playback data is supplied to the RLL (1, 7) demodulation circuit 106 for carrying out RLL (1, 7) demodulation to generate a data stream.

The data stream obtained as a result of the demodulation carried out by the RLL (1, 7) demodulation circuit 106 is written into the buffer memory 42 through a data bus 114 to be laid out in the memory 42.

The data stream laid out in the buffer memory 42 is subjected to error correction processing carried out by an ECC processing circuit 116 using an RS-PC technique in error correction block units before undergoing descramble processing and EDC-decode processing (Error Detected Code: a sort of error detection processing) in a descramble/EDC-decode circuit 117. A result produced by the processing carried out so far is user playback data DATAP. The user playback data DATAp is, for example, transferred from the descramble/EDC-decode circuit 117 to the data-processing/system control circuit 31 employed in the video-signal processing unit 3 at a data transfer rate determined by a transfer clock signal generated by a transfer-clock generating circuit 121.

The transfer-clock generating circuit 121 utilizes a clock of crystal system for generating a transfer clock signal at a frequency appropriate for, for example, data transfer between the media drive unit 4 and the video-signal processing unit 3 and among functional circuits within the media drive unit 4.

Detected information, that is, an optical current, read out by the optical head 53 from the disc 51 is supplied to a matrix amplifier 107, too.

The detected information supplied to the matrix amplifier 107 is subjected to necessary processing carried out by the matrix amplifier 107 to extract a tracking-error signal TE, a focus-error signal FE and groove information GFM, that is, an absolute address information recorded on the disc 51 as wobble of wobbled groove WG. The tracking-error signal TE and the focus-error signal FE are supplied to a servo processor 112 whereas the groove information GFM is supplied to an ADIP band-pass filter 108.

After experiencing band filtering in the ADIP band-pass filter 108, the groove information GFM with band area restriction is supplied to an A/B-track detecting circuit 109, an ADIP decoder 110 and the CLV processor 111.

The A/B-track detecting circuit 109 forms a judgment as to whether the track currently being traced is track Tr A or Tr B. The judgment is formed by using typically the technique based on the groove information GFM supplied to the A/B-track detecting circuit 109 as explained earlier by referring to FIG. 2. The result of the judgment representing the track being traced currently is supplied to the driver controller 46. The ADIP decoder 110 decodes the groove information GFM supplied thereto to extract an ADIP signal representing information on an absolute address on the disc 51. The ADIP signal is also supplied to the driver controller 46. The driver controller 46 executes necessary control based on the ADIP signal and the information indicating the track currently being used as described above.

The CLV processor 111 receives the clock signal CLK from the equalizer/PLL circuit 104 and the groove information GFM from the ADIP band-pass filter 108. The CLV processor 111 generates a spindle-error signal SPE for controlling the CLV servo from an error signal obtained typically as a result of integration of errors in phase between the groove information GFM and the clock signal CLK. The spindle-error signal SPE is supplied to the servo processor 112. It should be noted that necessary operations to be carried out by the CLV processor 111 are controlled by the driver controller 46.

The servo processor 112 outputs a variety of servo control signals such as a tracking control signal, a focus control signal, a sled control signal and a spindle control signal based on the tracking-error signal TE, the focus-error signal FE and the spindle-error signal SPE supplied thereto as described above in addition to commands such as a track-jump command and an access command received from the driver controller 46 to a servo driver 113.

In turn, the servo driver 113 generates necessary servo drive signals based on the servo control signals supplied thereto by the servo processor 112. The servo drive signals are a dual-axis drive signal for driving the dual-axis mechanism in the focus direction, a dual-axis drive signal for driving the dual-axis mechanism in the tracking direction, a sled-motor drive signal for driving the sled mechanism and a spindle-motor drive signal for driving the spindle motor 52.

These servo drive signals are supplied to the deck unit 5 to execute focus control and tracking control of the disc 51 as well as CLV control of the spindle motor 52.

In an operation to record user recording data DATAr into the disc 51, for example, the DATAr is supplied to a scramble/EDC-encode circuit 115 by the data-processing/system control circuit 31 employed in the video-signal processing unit 3 in synchronization with typically the transfer clock signal generated by the transfer-clock generating circuit 121.

In the scramble/EDC-encode circuit 115, the user recording data DATAr is written and laid out in the buffer memory 42 to undergo typically data scramble processing and EDC encode processing, that is, additional processing of error detection codes using a predetermined technique. After these pieces of processing, an ECC processing circuit 116 typically adds an error correction code based on the RS-PC technique to the user recording data DATAr laid out in the buffer memory 42.

The user recording data DATAr completing the processing so far is read out back from the buffer memory 42 and supplied to an RLL (1, 7) modulation circuit 118 through a data bus 114.

In the RLL (1, 7) modulation circuit 118, the user recording data DATAr supplied thereto is subjected to RLL (1, 7) modulation processing to generate a code trains of RLL (1, 7) which are output to a magnetic-head driving circuit 119 as recording data.

In the case of the MD-DATA2 format, by the way, a so-called laser-strobe magnetic-field modulation system is adopted as a recording system for recording data on a disc. With the laser-strobe magnetic-field modulation system, a magnetic field modulated by data being recorded is applied to the recording surface of the disc and, at the same time, a laser light is irradiated to the disc as pulses synchronized with the recorded data. With laser-strobe magnetic-field modulation system, a process of forming a pit edge recorded on the disc is determined by irradiation timing of the laser pulses independently of a transient characteristic such as a reversing velocity of the magnetic field.

As a result, with laser-strobe magnetic-field modulation system, the number of jitters of the recording pit can be reduced to an extremely small value with ease in comparison with, for example, a simple magnetic-field modulation system, a system whereby a laser light is irradiated to a disc in a steady state and, at the same time, a magnetic field modulated by data being recorded is applied to the recording surface of the disc. That is to say, the laser-strobe magnetic-field modulation system is a system advantageous to an effort to increase the recording density.

The magnetic-head driving circuit 119 employed in the media drive unit 4 drives the magnetic head 54 to apply a magnetic field modulated by data being recorded to disc 51. In addition, the RLL (1, 7) modulation circuit 118 also outputs a clock signal synchronized with the data being recorded to the laser driver 120. On the basis of the clock signal, the laser driver 120 drives a laser diode employed in the optical head 53 so that laser pulses synchronized with data being recorded generated by the magnetic head 54 as the magnetic field are radiated to the disc 51. At that time, the laser pulses emitted by the laser diode have proper power required for recording. In this way, the media drive unit 4 is capable of carrying out an operation to record data into the disc 51 by adopting the laser-strobe magnetic-field modulation system described above.

4. Operations in Stretched-Recording Mode 4-1. Writing Data into a Buffer Memory Next, a typical recording mode characterizing the embodiment is exemplified by a recording operation carried out in a stretched-recording mode. First of all, an operation to write data into the buffer memory 32 is explained.

FIG. 7 is a diagram showing conceptually a flow of data in an image shooting/recording operation carried out by the video camera implemented by the embodiment.

Image shooting signal data or video data obtained as a result of image shooting by means of the camera unit, that is, the lens block 1 and the camera block 2, and audio-signal data of sound picked up by the microphone 202 are compressed and then temporarily stored in the buffer-memory 32 through write operations in accordance with the MPEG2 and ATRAC2 formats respectively as is obvious from the previous explanation with reference to FIGS. 5, 5A and 5B. Later, the compressed video data and the compressed audio-signal data are read out back from the buffer memory 32 and transferred to the drive unit comprising the media drive unit 4 and the deck unit 5 to be recorded onto the disc 51.

As described above, the buffer memory 32 mainly plays a role of absorbing a difference in data transfer rate between 2 data transfers, namely, a data transfer between the camera unit comprising the lens block 1 and the camera block 2 or the mike unit, that is, the display/video/audio IO unit 6, and the buffer memory 32 and a data transfer between the buffer memory 32 and the drive unit comprising the media drive unit 4 and the deck unit 5.

Here, assume for example that an external disturbance such as vibration or a shock is given to the video camera implemented by the embodiment, putting the video camera in a circumstance in which an operation to record data onto the disc 51 can no longer be carried out in the drive unit. In such a circumstance, the rate of the data transfer from the buffer memory 32 to the drive unit must be reduced and, as a result, the rate of the data transfer from the camera unit or the mike unit to the buffer memory 32 is relatively high in comparison with the former data transfer. If the amount of information to be transferred from the camera unit or the mike unit to the buffer memory 32 becomes smaller for some reasons, on the other hand, the rate of the data transfer from the buffer memory 32 to the drive unit becomes relatively high in comparison with the rate of the data transfer from the camera unit or the mike unit to the buffer memory 32. As a result, the amount of data stored in the buffer memory 32 becomes smaller.

Assuming a relation between data transfer speeds described above, think of an operation in a stretched-recording mode provided by the embodiment.

A stretched recording operation takes place when the disc 51 is about to be replaced by a next one because the recording area in the disc 51 becomes all but full while the present video recording is being carried out. When the disc 51 is replaced by the next one, the present recording is suspended to be resumed later after the replacement is completed. While the disc 51 is being replaced with the next one, however, the image shooting is carried out as it is so that signal processing of video data and audio-signal data in the video-signal processing unit 3 can be continued. In the stretched recording operation, video data and audio-signal data obtained as a result of the signal processing which is carried out by the video-signal processing unit 3 while the disc 51 is being replaced with the next one are stored in the buffer memory 32. Then, by resuming the recording operation after the disc replacement has been completed, video data and audio data obtained during a period of time between the suspension of the data recording to replace the disc 51 and the resumption of the recording upon completion of the disc replacement can be prevented from being lost. Thus, data obtained in a stretched-recording operation is recorded into an area stretched over a plurality of discs wherein data recorded in a disc is followed by data recorded in a next disc continuously along the time axis with no information to be recorded lost.

In the implementation of the stretched-recording operation discussed above, however, it is necessary to consider the size of a free area which is left in the buffer memory 32 at a point of time the video camera is put in a circumstance requiring the stretched recording due to the fact that the storage capacity of the buffer memory 32 is much limited.

To put it in detail, the size of a free area left in the buffer memory 32, that is, the remaining capacity to store data, varies in dependence on the operating condition of the video camera at a point of time the video camera is put in a circumstance requiring the stretched recording. If the size of a free area left in the buffer memory 32 is large enough for assuring continuity of data along the time axis, that is, large enough for storing data output by the video-signal processing unit 3 during a period of time generally required to replace the disc 1, there will be no problem. If the size of a free area left in the buffer memory 32 is not large enough for storing data output by the video-signal processing unit 3 during a period of time generally required to replace the disc 1, however, the buffer memory 32 will also become full, that is, the free area will be all used up, while the disc 1 is being replaced, in which case data can no longer be stored in the buffer memory 32. As a result, some information of data to be recorded into the disc 51 will be lost.

In order to solve this problem, in a stretched-recording mode provided by the embodiment, signal processing and a recording operation described below are carried out so that as much continuity of data recorded in a storage area stretched over a plurality of discs along the time axis as possible is assured without regard to the size of the free area remaining in the buffer memory 32.

FIG. 8A is a diagram conceptually showing compressed video data and compressed audio-signal data stored in the buffer memory unit 32. It should be noted that the buffer memory unit 32 is implemented in a system wherein it is assumed that the ratio of an area allocated to compressed video data to an area allocated to audio data can be changed arbitrarily.

The following 2 equations hold true:

$$Maudio = Taudio \times Raudio \quad (1)$$

$$Mmovie = Tmovie \times Rmovie \quad (2)$$

where notation Raudio is an audio data rate, that is, the rate of the transfer of audio data to the buffer memory unit 32;

notation Taudio is an audio time duration, that is, the time duration to write audio data into the buffer memory unit 32;

notation Maudio is an audio buffered amount, that is, the amount of audio data stored in the buffer memory unit 32;

notation Rmovie is a moving-picture data rate, that is, the rate of the transfer of moving-picture data or, to be more specific, the rate of the transfer of video data compressed in accordance with the MPEG2 format, to the buffer memory unit 32;

notation Tmovie is a moving-picture time duration, that is, the time duration to write video data into the buffer memory unit 32; and notation Mmovie is a moving-picture buffered amount, that is, the amount of video data stored in the buffer memory unit 32.

FIG. 8A is a diagram showing quadrangles representing Eqs. (1) and (2). To be more specific, the length of the horizontal side and the length of the vertical side of the quadrangle on the right side represent the audio data rate Raudio and the audio time duration Taudio of Eq. (1) respectively. Thus, the area of the quadrangle represents the audio buffered amount Maudio. By the same token, the length of the horizontal side and the length of the vertical side of the quadrangle on the left side represent the moving-picture data rate Rmovie and the moving-picture time duration Tmovie of Eq. (2) respectively. Thus, the area of the quadrangle represents the moving-picture buffered amount Mmovie.

Thus, the total buffered amount M, that is, the total amount of data stored in the buffer-memory area 32, is represented by the following equation:

$$M = Maudio + Mmovie \quad (3)$$

That is to say, the total buffered amount M is the sum of the areas of the 2 quadrangles shown in FIG. 8A.

Typically, the moving-picture data rate Rmovie is about 4 Mbps (according to a full specification) and the audio data rate Raudio is about 0.1 Mbps. Thus, an area of the buffer memory unit 32 used for storing moving picture data is much larger than that used for storing audio data.

For the above reason, when there is only a small free area left in the buffer memory area 32, audio data is stored in the buffer memory area 32, taking precedence of video data. On the basis of a rational described below, the moving-picture data rate Rmovie, that is the amount of moving-picture data stored in the buffer-memory unit 32 per unit time, is first of all reduced so that the amount of moving-picture data stored in the buffer-memory unit 32 per unit time decreases.

The moving-picture data rate Rmovie is reduced typically by keeping the audio time duration Taudio equal to the moving-picture time duration Tmovie in the operation to write data into the buffer memory unit 32 as follows:

$$Taudio = Tmovie \quad (4)$$

On the other hand, the amount of data stored during a period of time to replace the disc 1 is Tchange×(Rmovie+Raudio) where notation Tchange is the length of the period of time. In order to assure continuity of an operation to store compressed video data and compressed audio data into the buffer memory unit 32, the amount of data stored during a period of time to replace the disc 1 shall not exceed the total buffered amount M as indicated by the following relation.

$$M > Tchange \times (Rmovie + Raudio) \quad (5)$$

Since the total buffered amount M can be interpreted as the size of the free area remaining in the buffer memory unit 32 and the period of time for disc replacement (Tchange) can be estimated, the sum (Rmovie+Raudio) can be found from Eq. (5). By continuing the operation to store compressed video data and compressed audio data at such a ratio, the free area left in the buffer memory unit 32 with a limited size can be utilized with the highest degree of efficiency.

Given the rationale described above, the video camera is switched from the normal-recording mode to a mode of the stretched-recording mode of the embodiment in accordance with a detected size of a free area left in the buffer memory unit 32.

To be more specific, at a point of time the size of the free area remaining in the disc 51 becomes equal to or smaller than a predetermined value, the video camera is switched from the normal-recording mode to the stretched-recording mode provided by the embodiment.

In the stretched-recording mode, first of all, it is necessary to form a judgment as to whether or not the size Mrem of the free area remaining in the buffer memory unit 32 satisfies the following relation:

$$Mrem>Tchange\times(Rmovie+Raudio) \qquad (6)$$

wherein notation Rmovie is a maximum speed determined by a full specification. If relation (6) is satisfied, it is all but out of the bounds of possibility that the buffer memory unit 32 becomes full while the disc 1 is being replaced, breaking the continuity of data being recorded along the time axis. In this case, the video camera is kept in a normal mode of the stretched-recording mode.

Diagrams of FIG. 8A correspond to the normal mode.

As described above, the MPEG2 decompression/encoding system supports a VBR technique for varying the data rate at which moving-picture data is compressed and encoded. In the stretched-recording mode, the VBR system is implemented. In the normal mode, moving-picture data is compressed and encoded at a data rate corresponding to a maximum rate specified in a full specification, that is, the maximum value of the variable data rate of the VBR system. The compressed and encoded moving-picture data is then stored in the buffer memory unit 32 at the moving-picture data rate Rmovie corresponding to this data rate.

On the other hand, audio data compressed in accordance with the ATRAC2 format is stored in the buffer memory unit 32 at a fixed audio data rate Raudio in any modes to be described later.

In the normal mode, data is stored into the buffer memory unit 32 typically in the same way as the normal-recording mode set prior to the stretched-recording mode. In the normal-recording mode, moving-picture data is stored in the buffer memory unit 32 typically at a data rate Rmovie corresponding to a maximum rate specified in a full specification, that is, the constant data rate of the CBR system.

If relation (6) is not satisfied, on the other hand, the video camera is put in a variable-moving-picture-data-rate mode. In this mode, the moving-picture data rate Rmovie is reduced to a value Rmovie2 that satisfies relation (6). moving-picture data is thus stored in the buffer memory unit 32 at this reduced moving-picture data rate Rmovie2.

A state of the buffer memory unit 32 in this variable-moving-picture-data-rate mode is shown in FIG. 8B.

As shown in FIG. 8B, by storing moving-picture data in the buffer memory unit 32 at this reduced moving-picture data rate Rmovie2, the moving-picture buffered amount Mmovie, that is, the amount of moving-picture data stored in the buffer memory unit 32 per unit time is also reduced. Comparison of the state shown in FIG. 8A with that of FIG. 8B indicates that, for the same total buffered amount M expressed by Eq. (3), the audio time duration Taudio and the moving-picture time duration Tmovie, that is, the lengths of the vertical sides of the quadrangles, are obviously longer in the variable-moving-picture-data-rate mode shown in FIG. 8B than those shown in FIG. 8A.

It should be noted that, the lower the data rate of the moving-picture data, the poorer the quality of the picture image and the smaller the size of the picture image. At least, however, no information is missing completely from the flow of data recorded in a storage area stretched over 2 discs along the time axis.

In case relation (6) can not be satisfied even by a minimum moving-picture data rate Rmovie2 in the variable-rate range of the VBR system in the stretched-recording mode, the video camera is switched to a still-picture mode of the stretched-recording mode.

In a still-picture mode, the MPEG2 video-signal processing circuit 33 stores sequentially pieces of still-picture data Mpic obtained as a result of JPEG compression of video data extracted from moving-picture data supplied thereto with proper timing in frame or field units (or video data of I pictures obtained as a result of an MPEG2 encoding process) into the buffer memory unit 32.

The amount of data stored in the buffer memory unit 32 corresponding to the moving-picture buffered amount Mmovie in the still-picture mode wherein pieces of still-picture data Mpic are sequentially stored in the buffer memory unit 32 is given by Eq. (7) as follows:

$$Mmovie=Mpic\times n \qquad (7)$$

wherein notation Mmovie is the amount of data stored in the buffer memory unit 32 corresponding to the moving-picture buffered amount Mmovie in the still-picture mode, notation Mpic is the amount of still-picture data and the symbol n is the number of still pictures. In this case, the audio buffered amount Maudio is expressed by Eq. (8) as follows:

$$Maudio=Tchange\times Raudio \qquad (8)$$

Since audio-sign al data is stored in the buffer memory unit 32, taking precedence of still-picture data, the still-picture data is stored in the remaining free area of the buffer memory unit 32 with a size equal to (Mrem-Maudio). Thus, the number of still pictures (n) is given by Eq. (9) as follows:

$$n=(Mrem-maudio)/Mpic \qquad (9)$$

Timing with which still-picture data are extracted from moving-picture data, that is, a time interval (Tstil) at which still-picture data are extracted from moving-picture data, is typically set in accordance with Eq. (10) as follows:

$$Tstil=Tchange/n \qquad (10)$$

By setting the timing as described above, as many still pictures as the free area in the buffer memory unit 32 is capable of accommodating can be obtained at all but equal time intervals.

FIG. 8C is a diagram showing a typical operation carried out in the still-picture mode. As compressed video data to be stored in the buffer memory unit 32, moving-picture data is not written into the buffer memory unit 32. Instead, still pictures Mpic (i), - - -, Mpic (n−1) and Mpic (n) are written thereto in accordance with the rules described above. The amount of the stored still pictures Mpic (i), - - -, Mpic (n−1) and Mpic (n) corresponding to the moving-picture buffered amount Mmovie given by Eq. (7) becomes very small. It is thus obvious that the time duration Taudio of audio data becomes very long by an increase commensurate with the reduction in Mmovie in comparison with Taudio shown in FIG. 8B. In the still-picture mode, however, recorded and reproduced video data is intermittent instead of being continuous along the time axis. As for audio data, continuity along the time axis can be assured.

In addition, even if still pictures are written in a still-picture mode, when the size Mrem of a free area remaining in the buffer memory unit 32 after transition to the stretched-recording mode can not assure the audio buffered amount Maudio expressed by Eq. (8), an audio mode of the stretched-recording mode not shown in the figure is set.

In the audio mode, an operation to store even still-picture data in the buffer memory unit 32 as compressed video data is halted. That is to say, only audio data is stored in the memory unit 32.

In this case, a disc replacement time Tchange expressed by the following equation can be assured.

$$Tchange=Taudio=Mrem/Raudio$$

While no video information is recorded during the disc replacement time Tchange, continuity of audio data along the time axis can be assured.

It should be noted that, in the case of an audio compression system with a variable data rate, for example, in the audio mode, the compressibility is increased as the size Mrem of a free area remaining in the buffer memory unit 32 decreases. Thus, it is quite within the bounds of possibility that audio data must be written into the buffer memory unit 32 at an audio data rate Raudio lower than a full-specification value.

Assume that one of the normal mode, the variable-moving-picture-data-rate mode, the still-picture mode and the audio mode is selected in accordance with the size Mrem of a free area remaining in the buffer memory unit 32 upon transition to the stretched-recording mode as described above. In this case, by storing data to be recorded into the buffer memory unit 32 in the selected mode, the size Mrem of a free area remaining in the buffer memory unit 32 assures that data of a period of t i m e corresponding to the disc replacement time Tchange c a n be stored in the free area. Then, during the stretched-recording mode, first of all, video recording is continued till the current disc 51 used for video recording so far becomes full. As the current disc 51 becomes full, the user replaces the current disc 51 with a replacement one during a sufficient period of time within the estimated disc replacement time Tchange and then resumes the video recording. It should be noted that, after the user replaces the current disc 51 with a replacement one and then resumes the video recording, the video camera is switched from the stretched-recording mode to the normal-recording mode. In the normal-recording mode, data is stored in the buffer memory unit 32 in the same recording operation as the normal mode explained earlier by referring to FIG. 8A. By virtue of the stretched-recording mode, continuity of video and audio along the time axis from the disc 51 prior to the replacement to a replacement disc is assured if one of the conditions for the normal mode, the variable-moving-picture-data-rate mode and the still-picture mode is satisfied. At least, continuity of the recorded audio data along the time axis is assured even if the worst comes to the worst, that is, if only the condition for the audio mode is satisfied.

4-2 Recording of Additional Information

The following is a description of additional information associated with a plurality of discs involved in a recording operation carried out in a stretched-recording mode to record data of video recording in an area stretched over the same plurality of discs. Additional information is a sort of control information such as information on a link between 2 discs and an identification of each individual disc other than video data and audio data recorded as user data described above.

FIG. 10 is a diagram showing a typical structure of an area stretched from an innermost circumference of the disc 51 provided by the embodiment to an outermost thereof.

On an optical magnetic disc used as the disc 51, the area on the innermost circumference is used as a pit area in which data dedicated for a playback operation by an emboss pit is created. In this pit area, a P-TOC (premastered TOC) is recorded. An area on the outer side of the pit area is an optical magnetic area, that is, an area which data can be recorded into and played back from. The optical magnetic area comprises lands Ld serving as recording tracks Tr•A and Tr•B, wobbled grooves WG and non-wobbled grooves NWG described earlier by referring to FIGS. 1 and 2.

A segment with a predetermined size on the innermost circumference of the optical magnetic area is used as a control area. The rest on outer circumferences of the optical magnetic area is a program area used for recording an actual program such as a musical piece. Mainly recorded in the control area is necessary control information which is required for controlling operations to record and playback a file into and from typically a U-TOC (user-TOC) disc. In this embodiment, the additional information is written into a predetermined region of this control area in accordance with a predetermined structure. An area on the outer-circumference side of the program area is used as a lead-out area.

In this embodiment, the additional information to be written onto the above control area typically includes pieces of data 1 to 7 described as follows:

1. A continuous-recording disc number: A sequence number assigned to each of a plurality of discs involved in video recording in a stretched-recording mode for recording data continuously along the time axis in an area stretched over the same plurality of discs. The sequence numbers indicate the order of discs in which data is recorded on the discs. When data is recorded on first to Nth discs, for example, continuous-recording disc numbers #1, #2, #3, - - - , #N are assigned to the first, second, third, - - - , Nth discs respectively.

2. Succeeding-disc link number: A number assigned to each of a plurality of discs and used as a link to a next disc involved in video recording in a stretched-recording mode for recording data continuously along the time axis in an area stretched over the same plurality of discs. A succeeding-disc link number is typically represented by a unique number based on a time and a date at which the disc is replaced.

3. Preceding-disc link number: A number assigned to each of a plurality of discs and used as a link to a preceding disc involved in video recording in a stretched-recording mode for recording data continuously along the time axis in an area stretched over the same plurality of discs. A preceding-disc link number is the counterpart of a succeeding-disc link number described above.

4. Preceding-disc ID: The name of a preceding disc of a plurality of discs linked to this disc involved in video recording in a stretched-recording mode for recording data continuously along the time axis in an area stretched over the same plurality of discs. A unique ID is assigned to each of the discs. In the case of the second disc, for example, the preceding-disc ID is the unique ID assigned to the first disc. In the case of the third or subsequent disc, the preceding-disc ID is the unique ID assigned to the second disc or a subsequent disc and so on. It should be noted that a unique ID assigned to each disc is recorded in the control area of the disc without regard to whether or not video recording of data in a stretched-recording mode is carried out.

5. Stretched-recording mode attribute information: Includes information indicating the normal mode, the variable-moving-picture-data-rate mode, the still-picture mode or the audio mode selected as a mode of the stretched-recording mode and information showing an area for recording in the stretched-recording mode. If the variable-moving-picture-data-rate mode is selected, for example, the stretched-recording mode attribute information also includes a data rate set in the variable-moving-picture-data-rate mode. If the still-picture mode is selected, the stretched-recording mode attribute information includes the number of still pictures to be recorded.

6. Disc name: A name automatically assigned to each of a plurality of discs involved in recording in a stretched-recording mode for recording data continuously along the time axis in an area stretched over the same plurality of discs. A disc name is an identification of a disc that can be displayed with ease typically in terms of characters. For example, possible disc names assigned to the first, second and third discs and so on are respectively "***", "*2", and "***3" et cetera. A disc name can be read out from the disc and displayed on the display unit 6A.

7. File name: A name automatically assigned to each file containing collected data in a plurality of discs involved in recording in a stretched-recording mode for recording data continuously along the time axis in an area stretched over the same plurality of discs. In the case of 2 discs involved in recording in a stretched-recording mode for recording data continuously along the time axis in an area stretched over the 2 discs, for example, it is necessary to treat the data recorded in the area stretched over the 2 discs as a file.

There are a variety of possible ways for assigning a file name. Typically, a file name conforms to the disc name described above. If the name assigned to a file recorded on the first disc is "*-*-", for example, names "*-*-2", "*-*-3" and so on are assigned to the same file on the consecutive second and third discs et cetera respectively. A file name can be read out from the disc and displayed on the display unit 6A.

Typically, the pieces of additional information 1 to 7 are written into the control area of the disc 51 on predetermined occasions during processing described below. By recording additional information in the stretched-recording mode on the disc 51, the information can be reproduced when necessary typically in a playback operation to be output to the display unit 6A. As a result, a library of a plurality of discs involved in stretched recording can be controlled with ease.

It should be noted that the additional information described above is no more than examples to the bitter end. That is to say, other kinds of additional information are conceivable. In addition, it is also possible to utilize only some of the additional information depending on how discs are controlled.

5. Processing Operations

The following is a description of processing operations for implementing the stretched-recording mode explained so far with reference to a flowchart shown in FIGS. 9, 9A and 9B. It should be noted that processing represented by the flowchart shown in this figure is mainly carried out by the video controller 38 in conjunction with the driver controller 46.

The processing represented by the flowchart shown in this figure is started from a state of a recording operation carried out in the normal-recording mode.

As shown by the flowchart of this figure, the processing begins with a step S101 at which the size of a free recording area remaining in the current disc 51 for recording video data and audio data is detected to form a judgment as to whether the detected size has become equal to or smaller than a predetermined value used as a criterion to switch from the normal-recording mode to the stretched-recording mode. The judgment can be based on an address at which the recording operation is currently being carried out by the driver controller 46 or the size of an area already used so far for recording.

If the outcome of the judgment formed at the step S101 indicates that the size of a free recording area remaining in the current disc 51 has become equal to or smaller than a predetermined value, the flow of the processing goes on to a step S102 at which the video controller 38 switches the recording mode to the stretched-recording mode. The flow of the processing then proceeds to a step S103 at which the size Mrem of a free area remaining in the buffer memory unit 32 is evaluated as the first processing in the stretched-recording mode to form a judgment as to whether the size Mrem of a free area remaining in the buffer memory unit 32 is within a predetermined range Mrem1, Mrem2, Mrem3 or Mrem4.

The range Mrem4 is a range of Mrem sizes of a free area remaining in the buffer memory unit 32 that allows data to be recorded in the normal mode explained earlier by referring to FIG. 8A. The range Mrem3 is a range of Mrem sizes of a free area remaining in the buffer memory unit 32 that allows data to be recorded in the variable-moving-picture-data-rate mode. The range Mrem2 is a range of Mrem sizes of a free area remaining in the buffer memory unit 32 that allows data to be recorded in the still-picture mode. The range Mrem1 is a range of Mrem sizes of a free area remaining in the buffer memory unit 32 that allows data to be recorded in the audio mode. The predetermined ranges Mrem1, Mrem2, Mrem3 and Mrem4 thus satisfy the following relation:

$$0 \leq Mrem1 < Mrem2 < Mrem3 < Mrem4 \leq M$$

where the symbol M is the size of the whole buffer memory unit 32.

If the evaluation of the step S103 indicates that the size Mrem of a free area remaining in the buffer memory unit 32 is in the range Mrem4, the flow of the processing goes on to a step S104 at which the video controller 38 carries out processing to write data into the buffer memory unit 32 in the normal mode. The processing carried out at the step S104 has been explained earlier by referring to FIG. 8A.

If the evaluation of the step S103 indicates that the size Mrem of a free area remaining in the buffer memory unit 32 is in the range Mrem3, the flow of the processing goes on to a step S105 at which the variable-moving-picture-data-rate mode is set. The flow of the processing then proceeds to a step S106 at which data of a moving-picture is stored into the buffer memory unit 32 at a moving-picture data rate Rmovie determined by controlling the MPEG2 video-signal processing circuit 33 at a value appropriate for the size of Mrem in the range Mrem 3.

If the evaluation of the step S103 indicates that the size Mrem of a free area remaining in the buffer memory unit 32 is in the range Mrem2, the flow of the processing goes on to a step S107 at which the still-picture mode is set. The flow of the processing then proceeds to a step S108 at which data of a number of still pictures is stored into the buffer memory unit 32. The number of still pictures is set by controlling the MPEG2 video-signal processing circuit 33 at a value appropriate for the size of Mrem in the range Mrem2. The still pictures output by the MPEG2 video-signal processing circuit 33 are stored in the buffer memory unit 32 with proper timing along with audio data.

If the evaluation of the step S103 indicates that the size Mrem of a free area remaining in the buffer memory unit 32 is in the range Mrem1, the flow of the processing goes on to a step S109 at which the audio mode is set. The flow of the processing then proceeds to a step S110 at which only audio data is stored in the buffer memory unit 32. That is to say, compressed video data is not stored in buffer memory unit 32.

Then, the flow of the processing continues from the steps S104, S106, S108 or S110 to a step S111 to form a judgment as to whether or not the size of a recording area remaining in the disc 51 has become 0. That is to say, the step Sill is a state of waiting for the recording area of the disc 51 to become full, allowing no more data to be recorded therein. As the recording area of the disc 51 becomes full, the flow of the processing goes on to a step S112.

At the step S112, additional information required by the disc 51 used for the recording carried out so far is generated and recorded in the control area of the disc 51. Some or all of the pieces of additional information 1 to 7 which are required for the disc 51 are recorded. Typically, the processing of the step S112 is carried out by the driver controller 46 employed in the media drive unit 4.

As the processing carried out at the step S112 is finished, the flow of the processing proceeds to a step S113 at which the video controller 38 typically executes control to display a message urging the user to replace the disc 51 on the display unit 6A or to output an audio signal advising the user to do so. The output message or the audio signal makes the user aware of the fact that the end of the recording time or the end of the remaining recording area is imminent. As a result, the time to replace the disc 51 can not be overlooked. At that time, the video controller 38 is capable of computing the allowable maximum length of the disc replacement time Tchange, that is, a period of time between the start of the disc replacement and a point of time the buffer memory unit 32 is all filled up by data written thereto in the stretched-recording mode. In order to improve the video camera more operable in a way desired by the user, it is desirable to also display Tchange, that is, a period of time provided to the user for replacing the disc 51 before the buffer memory unit 32 becomes full.

After the processing carried out at the step S113 is finished, the flow continues to a step S114 to form a judgment as to whether or not the manual work done by the user to replace the disc 51 has been completed. Typically, the deck unit 5 is provided with a mechanical switch or a photo detector which is capable of detecting a state with a disc 51 mounted and a state with a disc 51 removed and distinguishing the states from each other. The judgment is formed by the driver controller 46 on the basis of a detection signal generated by the mechanical switch or the photo detector to indicate that a disc 51 has been newly mounted. As the outcome of the judgment formed at the step S114 indicates that the manual work done by the user to replace the disc 51 has been completed, the flow of the processing goes on to a step S115 at which the driver controller 46 typically records additional information into the control area of the replacement disc 51.

The flow of the processing then goes on to a step S116 at which the stretched-recording mode is ended and the normal-recording mode is reestablished to resume the operation to record moving-picture data and audio data this time on the replacement disc 51. In this case, the rate of the moving-picture data is the full-specification maximum value.

In a normal recording operation, a shock or an external disturbance may be given to the main body of the video camera sometimes, making it impossible to record data on the disc 51. Even in such a circumstance, the size Mrem of a free area remaining in the buffer memory unit 32 keeps decreasing. If such a circumstance continues, the size Mrem of a free area remaining in the buffer memory unit 32 becomes insufficient.

Thus, there is a case other than the disc replacement described above in which it is quite within the bounds of possibility that continuity of video recording of data onto the disc 51 along the time axis can not be assured any more. In order to solve this problem, the ranges Mrem1, Mrem2, Mrem3 and Mrem4 are determined by considering, among other factors, an assumed time it takes to recover the operation to record data on the disc 51. Execution of the pieces of processing of the steps S103 to S110 of the flowchart shown in FIG. 9 based on the ranges Mrem1, Mrem2, Mrem3 and Mrem4 is of course conceivable. In this case, however, the driver controller 46 is put in a state of waiting for the operation to record data on the disc 51 to be recovered while data is being written into the buffer memory unit 32 in the normal mode, the variable-moving-picture-data-rate mode, the still-picture mode or the audio mode. As the operation to record data on the disc 51 is recovered, the normal recording mode is resumed with proper timing.

6. Playback Operation

The following is a brief description of an operation to play back data recorded on the disc 51 in the stretched-recording mode explained earlier.

In a playback operation, first of all, information is read out from the control area of a disc 51 mounted on the deck unit 5 of the video camera. At that time, pieces of additional information 1 to 7 related to the stretched-recording mode described earlier are also read out as well. The additional information read out from the control area of the disc 51 is stored in a predetermined area of the buffer memory unit 42. of course, the driver controller 46 appropriately utilizes the additional information stored in the buffer memory unit 42 for necessary control of the media drive unit 4 and also transfers the additional information to the video controller 38. The video controller 38 is thus capable of executing necessary control of the video-signal processing unit 3 by using the additional information.

In an operation to play back data recorded in the stretched-recording mode as part of the operation to play back data from the disc 51, the video controller 38 typically executes necessary control of a variety of functional circuits employed in the video-signal processing unit 3 based on the additional information so as to set a playback mode corresponding to the normal mode, the variable-moving-picture-data-rate mode, the still-picture mode or the audio mode selected as a mode of the stretched recording mode to write data in the buffer memory unit 32. Particularly, in an operation to play back data recorded in the variable-moving-picture-data-rate mode, the video controller 38 typically executes control of the same variety of functional circuits such as mainly the MPEG2 video-signal processing circuit 33 so as to carry out necessary signal processing, mainly decoding appropriate for a data rate of moving-picture data set in the variable-moving-picture-data-rate mode.

In addition, in an operation to play back data recorded in the still-picture mode, the video-signal processing unit 3 decompresses still-picture data played back from the disc 51 in accordance with typically a JPEG format or the format of the MPEG2 I picture. The video controller 38 controls the video-signal processing unit 3 so that still pictures are sequentially output and displayed with timing corresponding to the timing used in the still-picture mode. Typically, the still pictures are output and displayed at intervals expressed by Eq. (10).

In addition, in an operation to play back data recorded in the audio mode, only audio data read out from the disc 51 is played back and output as an audio-signal. It should be noted that, at that time, a blue-back technique is typically applied to display a picture as a possible operation. The blue-back technique sustains a state to display last video data among recorded data obtained prior to the audio mode on a still-picture screen.

Assume that, in an operation to play back data recorded on the disc 51 in the stretched-recording mode, a disc following this recording 51 is required to undergo the so-called stretched playback operation. In this case, the video controller 38 executes control so that a message based on the additional information is typically generated and output to the display unit 6A or an external monitor unit to make the user able to recognize the following disc which remains to be played back. By taking a look at the message, the user is capable of recognizing the following disc containing continuation data of the disc 51 currently being played back. Thus, the user can make a preparation for the next playback operation in advance.

It should be noted that implementations of the present invention are not limited to the embodiment. That is to say, the scope of the present invention includes a variety of modifications of the embodiment. For example, in the video camera implemented by the embodiment, a disc recording/reproducing apparatus based on the MD-DATA2 format is employed as a video recording/playback member. Considering the object of the present invention to prevent continuity of video-recording data along the time axis from becoming unsustainable in a stretched-recording operation, however, a recording/reproducing apparatus for recording media of types other than the disc each with a configuration different from that provided by the embodiment can also be employed as a video recording/playback member. An example of such other recording media is a tape.

In addition, the MPEG2 system in the embodiment is typically adopted as a technique for compressing data of a video as described above. It is worth noting, however, that the compression method is not limited to the MPEG2 system in particular. Any video compressing system can be embraced as long as the system supports a variable data rate of video data subjected to the compression and encoding process. Furthermore, the technique to compress data of still pictures and audio data do not have to be respectively the JPEG and ATRAC2 methods adopted in the embodiment in particular.

As described above, under a condition that it is quite within the bounds of possibility that continuity of data being recorded on a disc during a normal recording operation along the time axis is unsustainable, the recording apparatus provided by the embodiment measures the size of a free area remaining in a storage means for temporarily storing compressed video data and compressed audio data. The recording apparatus then switches the normal-recording operation to one of stretched-recording operations with compressed audio data given a priority higher than that of compressed video data. The stretched-recording operation selected in dependence on the size of the free area is an operation with a reduced rate of compressed video data being written into the storage means, an operation to write compressed data of still pictures in place of video into the storage means or an operation to write only compressed audio data into the storage means, excluding video data. In a worst condition, continuity of compressed audio data being recorded on a disc can be sustained. If such a recording apparatus is employed in a video camera, for example, continuity of data recorded in an area stretched over a plurality of discs along the time axis can be obtained, allowing the video camera to be operated more in a way desired by the user.

What is claimed is:

1. A recording apparatus comprising:

a video compressing means for compressing input video data;

an audio compressing means for compressing input audio data;

a storage means for storing compressed video data generated by said video compressing means and compressed audio data produced by said audio compressing means;

a recording means for reading out compressed video data and compressed audio data temporarily stored in said storage means back from said storage means with predetermined timing and then recording said compressed video and audio data read out from said storage means into a recording medium;

a storage-size detecting means for finding a storage-size of said storage means; and a storage-means control means for writing compressed audio data generated by said audio compressing means to be supplied to said storage means into said storage means at a priority higher than compressed video data produced by said video compressing means to be supplied to said storage means in accordance with a storage-size of said storage means found by said storage-size detecting means.

2. A recording apparatus according to claim 1 wherein said storage-size found by said storage-size detecting means is a size of a free area left in said storage means.

3. A recording apparatus according to claim 1 wherein said storage-size found by said storage-size detecting means is a size of an area already used for storing data in said storage means.

4. A recording apparatus according to claim 1 wherein said storage-means control means executes control to vary the compressibility of compressed video data produced by said video compressing means to be supplied to said storage means.

5. A recording apparatus according to claim 1 wherein said storage-means control means stores only still pictures of compressed video data produced by said video compressing means to be supplied to said storage means into said storage means.

6. A recording apparatus according to claim 1 wherein said storage-means control means stores only compressed audio data produced by said audio compressing means to be supplied to said storage means into said storage means.

7. A recording apparatus according to claim 1 capable of accommodating a plurality of recording mediums and replacing one of said recording mediums with another one selected among said recording mediums wherein said storage means compensates compressed video data and compressed audio data recorded in said recording mediums for recording interruptions generated during replacements of said recording mediums.

8. A recording and reproducing apparatus comprising:

a video compressing means for compressing input video data;

an audio compressing means for compressing input audio data;

a storage means for storing compressed video data generated by said video compressing means and compressed audio data produced by said audio compressing means;

a storage-size detecting means for finding a storage-size of said storage means;

a control means for controlling said video compressing means to thin compressed video data generated thereby in accordance with a storage-size of said storage means found by said storage-size detecting means so as to reserve an area in said storage means large enough for storing compressed audio data produced by said audio compressing means to be supplied to said storage means;

an identifier generating means for generating an identifier used for identifying a control state of said control means;

a recording means for reading out compressed video data, compressed audio data and said identifier generated by said identifier generating means to identify a control state of said control means temporarily stored in said storage means back from said storage means with predetermined timing and then recording said compressed video data, said compressed audio data and said identifier read out from said storage means into a recording medium;

a reproducing means for reproducing compressed video data, compressed audio data and said identifier used for identifying a control state of said control means from said recording medium;

a video decompressing means for decompressing compressed video data reproduced by said reproducing means;

an audio decompressing means for decompressing compressed audio data reproduced by said reproducing means; and a video-decompressing-means control means for controlling decompression carried out by said video decompressing means in accordance with said identifier reproduced by said reproducing means.

9. A recording and reproducing apparatus according to claim 8 wherein:

said identifier generated by said identifier generating means to identify a control state of said control means shows that the compressibility of compressed video data stored in said storage means is variable; and said video decompressing means decompresses compressed video data at a decompressibility corresponding to said compressibility of said compressed video data indicated by said identifier reproduced from said recording medium.

10. A recording and reproducing apparatus according to claim 8 wherein:

said identifier generated by said identifier generating means to identify a control state of said control means shows that compressed video data stored in said storage means is data of still pictures only; and said video decompressing means decompresses said data of still pictures in accordance with said identifier reproduced from said recording medium.

11. A recording and reproducing apparatus according to claim 8 wherein:

said identifier generated by said identifier generating means to identify a control state of said control means shows that only compressed audio data has been stored in said storage means; and said video decompressing means halts decompression of compressed video data in accordance with said identifier reproduced from said recording medium.

12. A recording and reproducing apparatus according to claim 8 wherein control of said video compressing means to thin compressed video data generated thereby is executed by said control means by varying said compressibility of said compressed video data.

13. A recording and reproducing apparatus according to claim 8 wherein control of said video compressing means to thin compressed video data generated thereby is executed by said control means by storing video data of still pictures only in said storage means.

14. A recording and reproducing apparatus according to claim 8 wherein control of said video compressing means to thin compressed video data generated thereby is executed by said control means by storing only audio data in said storage means.

15. A recording method comprising the steps of: compressing input video data; compressing input audio data;

storing compressed video data and compressed audio data in a memory;

finding a storage-size of said memory;

writing compressed audio data supplied to said memory into said memory at a priority higher than compressed video data supplied to said memory in accordance with said storage-size of said memory; and reading out compressed video data and compressed audio data temporarily stored in said memory back from said memory with predetermined timing and then recording said compressed video and audio data read out from said memory into a recording medium.

* * * * *

UNITED STATES PATENT AND TRADEMARK OFFICE
CERTIFICATE OF CORRECTION

PATENT NO.      : 6,259,859 B1
DATED           : July 10, 2001
INVENTOR(S)     : Shinji Katsuki et al.

It is certified that error appears in the above-identified patent and that said Letters Patent is hereby corrected as shown below:

Column 3,
Line 43, delete "and".

Column 7,
Line 52, change "a" (first occurrence) to -- an --.

Column 13,
Line 5, after "FIGS." insert -- 6, --.
Line 20, change "are" to a period.
Line 65, change "DATAP" to -- DATAp --.

Column 18,
Line 27, change "moving picture" to -- moving-picture --.

Column 19,
Line 44, change "moving-picture" to -- Moving-picture --.

Column 20,
Line 16, change "Mpicxn" to -- Mpic X n --.
Line 26, change "sign al" to -- signal --.

Column 21,
Line 26, change "t i m e" to -- time --.
Line 27, change "c a n" to -- can --.

Column 25,
Line 1, change "Sill" to -- S111 --.

UNITED STATES PATENT AND TRADEMARK OFFICE
CERTIFICATE OF CORRECTION

PATENT NO.    : 6,259,859 B1
DATED         : July 10, 2001
INVENTOR(S)   : Shinji Katsuki et al.

It is certified that error appears in the above-identified patent and that said Letters Patent is hereby corrected as shown below:

<u>Column 26,</u>
Line 26, change "of" to -- Of --.

Signed and Sealed this

Twenty-sixth Day of March, 2002

*Attest:*

JAMES E. ROGAN
*Attesting Officer*   *Director of the United States Patent and Trademark Office*